(12) United States Patent
Wu et al.

(10) Patent No.: US 12,255,718 B2
(45) Date of Patent: *Mar. 18, 2025

(54) CSI FEEDBACK AND RECEIVING METHODS, APPARATUS, DEVICE, AND STORAGE MEDIUM

(71) Applicant: ZTE Corporation, Guangdong (CN)

(72) Inventors: Hao Wu, Shenzhen (CN); Yijian Chen, Shenzhen (CN); Guozeng Zheng, Shenzhen (CN); Yong Li, Shenzhen (CN); Zhaohua Lu, Shenzhen (CN); Yu Ngok Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,539

(22) Filed: Oct. 30, 2023

(65) Prior Publication Data

US 2024/0080079 A1 Mar. 7, 2024

Related U.S. Application Data

(63) Continuation of application No. 17/244,724, filed on Apr. 29, 2021, now Pat. No. 11,804,886, which is a
(Continued)

(30) Foreign Application Priority Data

Nov. 2, 2018 (CN) .......................... 201811302880.2

(51) Int. Cl.
*H04B 7/06* (2006.01)
*H04B 7/0417* (2017.01)
(Continued)

(52) U.S. Cl.
CPC ......... *H04B 7/0626* (2013.01); *H04B 7/0417* (2013.01); *H04B 7/0456* (2013.01); *H04B 7/0639* (2013.01); *H04W 72/0453* (2013.01)

(58) Field of Classification Search
CPC .. H04B 7/0626; H04B 7/0417; H04B 7/0456; H04B 7/0639; H04W 72/0453
(Continued)

(56) References Cited

U.S. PATENT DOCUMENTS 11,804,886 B2 * 10/2023 Wu ...................... H04B 7/0478
2016/0182137 A1 6/2016 Onggosanusi et al.
(Continued)

FOREIGN PATENT DOCUMENTS

CN 107113039 A 8/2017
CN 108111200 A 6/2018
(Continued)

OTHER PUBLICATIONS

International Search Report and Written Opinion for priority application No. PCT/CN2019/114977, dated January 31, 2020, 6p, in Chinese language.
(Continued)

*Primary Examiner* — Nghi H Ly
(74) *Attorney, Agent, or Firm* — Crowell & Moring LLP

(57) ABSTRACT

Provided are CSI feedback and receiving methods, apparatuses, a device, and a storage medium. The method includes: a terminal determines PMI, the PMI includes at least one of: first base vector information, second base vector information, second coefficient amplitude information or phase information; for one transmission layer, a frequency domain resource in one preset frequency domain unit corresponds to one precoding vector, the precoding vector is a linear combination of first base vectors, and weighting coefficients used in the linear combination of the first base vectors are first coefficients; on multiple frequency domain units contained in a CSI feedback band, a vector composed of first coefficients corresponding to a same first base vector is a linear combination of second base vectors, and weighting
(Continued)

coefficients used in the linear combination of the second base vectors are second coefficients; and the terminal feeds back CSI containing the PMI to a base station.

20 Claims, 5 Drawing Sheets

Related U.S. Application Data continuation of application No. PCT/CN2019/114977, filed on Nov. 1, 2019.

(51) Int. Cl.
    *H04B 7/0456*     (2017.01)
    *H04W 72/0453*     (2023.01)

(58) Field of Classification Search
    USPC ............... 370/329, 328, 338, 341, 345, 350
    See application file for complete search history.

(56) References Cited

U.S. PATENT DOCUMENTS

| | | |
|---|---|---|
| 2017/0279514 A1 | 9/2017 | Rahman et al. |
| 2017/0302353 A1 | 10/2017 | Rahman et al. |
| 2018/0302140 A1 | 10/2018 | Rahman et al. |
| 2019/0260430 A1 | 8/2019 | Cai et al. |
| 2021/0328646 A1 | 10/2021 | Wu et al. |

FOREIGN PATENT DOCUMENTS

| | | |
|---|---|---|
| CN | 108111211 A | 6/2018 |
| WO | WO 2018/028429 A1 | 2/2018 |

OTHER PUBLICATIONS

English language translation of International Search Report for priority application No. PCT/CN2019/114977, dated Jan. 31, 2020, 2p.
Concise Explanation of Relevance of the Written Opinion of the International Search Authority for PCT/CN2019/114977, 1p.
Extended European Search Report for European application No. 19879156.8 dated Nov. 24, 2021, 10p.
Search Report and Written Opinion for corresponding Singapore application No. 11202103259T dated Jan. 30, 2023, 13p, in English language.
Official Action for corresponding Japanese application No. 2021-518180 dated Aug. 2, 2023, 4p, in Japanese language.
English translation for Official Action for corresponding Japanese application No. 2021-518180 dated Aug. 2, 2023, 9p.
Fraunhofer Iis et al., "Enhancements on Type-II CSI reporting";3GPP TSG-RAN WG1 #94-Bis, R1-1811088, dated Oct. 12, 2018, 7p, CN.
Huawai et al., "Discussion on CSI enhancement for MU-MIMO", 3GPP TSG RAN WG1 Meeting #94bis, R-1810103, dated Oct. 12, 2018, 10p, CN.
Samsung, "CSI enhancement for MU-MIMO", 3GPP TSG RAN WG1 Meeting #94b, R1-1810884, Oct. 12, 2018, 6p, CN.
Extended European Search Report for corresponding application No. EP 23197921.2 dated Mar. 26, 2024, 11p.
Korean Office Action with English translation, pp. 1-9, issued on Oct. 14, 2024, in Korean Patent Application No. 10-2021-7009741.

* cited by examiner

CSI FEEDBACK AND RECEIVING METHODS, APPARATUS, DEVICE, AND STORAGE MEDIUM

RELATED APPLICATION

This application is a continuation of U.S. patent application Ser. No. 17/244,724, now U.S. Pat. No. 11,804,886, which is a continuation of International Application No. PCT/CN2019/114977, filed Nov. 1, 2019, which claims priority to Chinese Patent Application No. 201811302880.2 filed on Nov. 2, 2018 to the CNIPA. The disclosure of the aforementioned applications are incorporated herein by reference in their entireties.

TECHNICAL FIELD

The present disclosure relates to, but is not limited to, the field of communications and, in particular, relates to, but is not limited to, channel state information (CSI) feedback and receiving methods, an apparatus, a device, and a storage medium.

BACKGROUND

In a multiple input multiple output (MIMO) wireless communication system, precoding or beamforming is performed on multiple transmit antennas, thereby achieving the purpose of improving transmission efficiency and reliability. In order to implement high-performance precoding or beamforming, a precoding matrix or a beamforming vector needs to be well matched with a channel, which requires that the transmit end can smoothly obtain channel state information (CSI). Therefore, CSI feedback is a key technology for implementing high-performance precoding or beamforming in the MIMO system.

However, in the related art, when the CSI feedback is performed, linear weighted merging is performed on a discrete Fourier transform (DFT) vector or a Kronecker product of DFT vectors, and the vector subjected to the weighted merging is called a codebook base vector. Information related to the codebook base vector, an amplitude of a weighting coefficient, and phase information are fed back to a base station as precoding indication information. In order to improve the performance of the codebook, a terminal needs to feed back phase and/or amplitude information of the weighting coefficient of each codebook base vector for each sub-band. Therefore, when there are a lot of sub-bands, the quantization feedback on a channel matrix may bring a large CSI feedback overhead, but if only information about the amplitude or the phase of the weighting coefficients over the entire wideband is fed back, the high performance gain brought by this kind of codebook feedback cannot be fully exerted.

SUMMARY

CSI feedback and receiving methods, an apparatus, a device, and a storage medium provided by embodiments of the present disclosure can at least solve the problem in the related art that the CSI feedback overhead is large when the CSI is accurately fed back.

The embodiments of the present disclosure provide a CSI feedback method. The method includes steps described below.

A terminal determines precoding matrix indication information (PMI). The PMI includes first base vector information, second base vector information and second coefficient information, and the second coefficient information includes second coefficient amplitude information and/or second coefficient phase information. Precoding vectors corresponding to frequency domain resources in a preset frequency domain unit are the same, a precoding vector is a linear combination of first base vectors, and weighting coefficients used in the linear combination of the first base vectors are first coefficients. On multiple frequency domain units contained in a CSI feedback band, a vector composed of first coefficients corresponding to a same first base vector is a linear combination of second base vectors, and weighting coefficients used in the linear combination of the second base vectors are second coefficients.

The terminal feeds back CSI containing the PMI to a base station.

The embodiments of the present disclosure further provide a CSI receiving method. The method includes steps described below.

A base station receives CSI containing PMI and fed back by a terminal.

The base station acquires first base vector information, second base vector information and second coefficient information from the PMI. The second coefficient information includes second coefficient amplitude information and/or second coefficient phase information. Precoding vectors corresponding to frequency domain resources in a preset frequency domain unit are the same, a precoding vector is a linear combination of first base vectors, and weighting coefficients used in the linear combination of the first base vectors are first coefficients. On multiple frequency domain units contained in a CSI feedback band, a vector composed of first coefficients corresponding to a same first base vector is a linear combination of second base vectors, and weighting coefficients used in the linear combination of the second base vectors are second coefficients.

The embodiments of the present disclosure further provide a CSI feedback apparatus. The apparatus includes a determination module and a feedback module.

The determination module is configured to determine precoding matrix indication information (PMI). The PMI includes first base vector information, second base vector information and second coefficient information, and the second coefficient information includes second coefficient amplitude information and/or second coefficient phase information. Precoding vectors corresponding to frequency domain resources in a preset frequency domain unit are the same, a precoding vector is a linear combination of first base vectors, and weighting coefficients used in the linear combination of the first base vectors are first coefficients. On multiple frequency domain units contained in a CSI feedback band, a vector composed of first coefficients corresponding to a same first base vector is a linear combination of second base vectors, and weighting coefficients used in the linear combination of the second base vectors are second coefficients.

The feedback module is configured to feedback CSI containing the PMI to a base station.

The embodiments of the present disclosure further provide a CSI receiving apparatus. The apparatus includes a receiving module and an acquisition module.

The receiving module is configured to receive CSI containing PMI and fed back by a terminal.

The acquisition module is configured to acquire first base vector information, second base vector information and second coefficient information from the PMI. The second coefficient information includes second coefficient amplitude information and/or second coefficient phase information. Precoding vectors corresponding to frequency domain resources in a preset frequency domain unit are the same, a precoding vector is a linear combination of first base vectors, and weighting coefficients used in the linear combination of the first base vectors are first coefficients. On multiple frequency domain units contained in a CSI feedback band, a vector composed of first coefficients corresponding to a same first base vector is a linear combination of second base vectors, and weighting coefficients used for the linear combination of the second base vectors are second coefficients.

The embodiments of the present disclosure further provide a terminal. The terminal includes a first processor, a first memory and a first communication bus.

The first communication bus is configured to implement a connection communication between the first processor and the first memory.

The first processor is configured to execute one or more programs stored in the first memory to perform the CSI feedback method described above.

The embodiments of the present disclosure further provide a base station. The base station includes a second processor, a second memory and a second communication bus.

The second communication bus is configured to implement a connection communication between the second processor and the second memory.

The second processor is configured to execute one or more programs stored in the second memory to perform the CSI receiving method described above.

The embodiments of the present disclosure further provide a computer-readable storage medium, which is configured to store one or more programs executable by one or more processors to implement any one of methods described above.

According to the CSI feedback and receiving methods, apparatuses, a device, and a storage medium provided by embodiments of the present disclosure, the terminal determines the precoding matrix indication information (PMI), the PMI includes the first base vector information, the second base vector information and the second coefficient information, and the second coefficient information includes second coefficient amplitude information and/or second coefficient phase information; precoding vectors corresponding to frequency domain resources in a preset frequency domain unit are the same, a precoding vector is a linear combination of first base vectors, and weighting coefficients used in the linear combination of the first base vectors are first coefficients; on multiple frequency domain units contained a CSI feedback band, a vector composed of first coefficients corresponding to a same first base vector is a linear combination of second base vectors, and weighting coefficients used in the linear combination of the second base vectors are second coefficients; and the terminal feeds back the CSI containing the PMI to the base station. The CSI feedback is performed after frequency domain and spatial domain channel coefficients are compressed, thereby enduring the high CSI feedback performance while reducing the CSI feedback overhead.

DETAILED DESCRIPTION

In a high-precision CSI feedback method in the related art, a terminal feeds back a number of columns of a precoding matrix, i.e., a channel rank indicator (RI). A precoding vector of each layer is represented as a linear combination of a set of codebook base vectors, and the set of codebook base vectors may be referred to as first base vectors. The terminal calculates weighting coefficients used in the linear combination according to the first base vectors, and quantizes and feeds back amplitude information and phase information of the weighting coefficients, and the weighting coefficients may be referred to as first coefficients. In order to improve feedback performance, the amplitude information and phase information of the first coefficients usually need to be reported according to a sub-band. The sub-band is a frequency domain granularity. For all resource blocks (RBs) contained in the CSI feedback band, M consecutive RBs form a sub-band. In this way, the CSI feedback band may contain N sub-bands having a size of M.

For the above CSI feedback method, on an nth sub-band fed back by the terminal, a precoding vector of a certain layer may be expressed as follows:

$$f_n = W_1 c_n$$

$W_1$ is a first base vector, for example, consists of a set of orthogonal DFT vectors or a Kronecker product of DFT vectors, and $c_n$ is a vector composed of the first coefficients. In general, the information in $W_1$ is fed back by a wideband, that is, for different sub-bands over the entire CSI feedback band, the information in $W_1$ is the same. Specifically, the number of base vectors contained in $W_1$ is L, that is, the number of columns of $W_1$ is L. For example, $W_1$ is a block diagonal matrix, and vectors contained in the diagonal block are orthogonal DFT vectors or the Kronecker products of DFT vectors. For a precoding vector of this layer, first coefficients on each sub-band are combined into a following matrix:

$$C = \begin{bmatrix} c_{11} & \cdots & c_{1N} \\ \vdots & \ddots & \vdots \\ c_{L1} & \cdots & c_{LN} \end{bmatrix}$$

When the amplitude information and phase information of elements in the matrix C are directly quantified and fed back, the feedback overhead will be relatively large. Therefore, a CSI feedback method is needed urgently to reduce the CSI feedback overhead and ensure the high CSI feedback performance.

To illustrate the objects, solutions and advantages of the present application clearer, the embodiments of the present disclosure will be described below in detail in conjunction with the embodiments and drawings. It is to be understood that the embodiments described herein are merely intended to explain the present application and not to limit the present application.

Embodiment One

Figure 1:
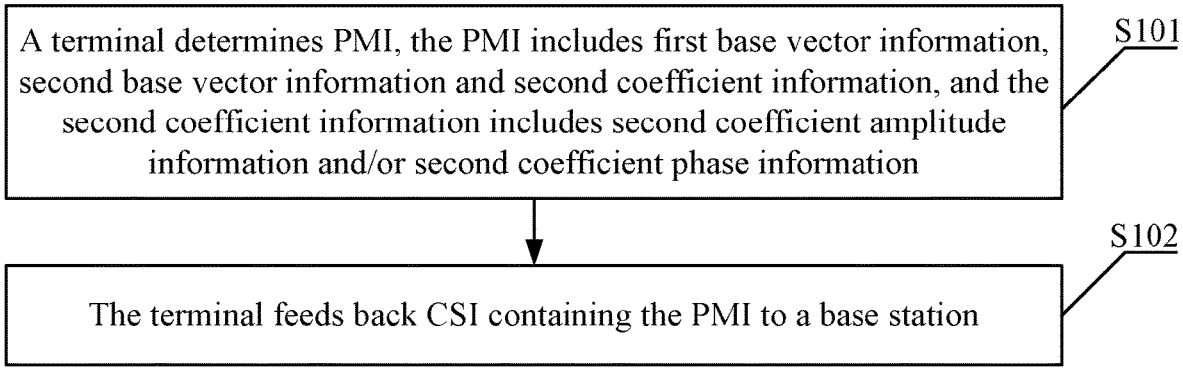
FIG. 1 is a flowchart of a CSI feedback method applied on a terminal side according to an embodiment one of the present disclosure.

In order to resolve the problem in the related art that the CSI feedback overhead is large when the CSI is accurately fed back, this embodiment provides a CSI feedback method. The CSI feedback method provided by this embodiment is applied on a terminal side, as shown in FIG. 1, the method includes steps described below.

In S101, a terminal determines precoding matrix indication information (PMI), the PMI includes first base vector information, second base vector information and second coefficient information, and the second coefficient information includes second coefficient amplitude information and/or second coefficient phase information; precoding vectors corresponding to frequency domain resources in a preset frequency domain unit are the same, a precoding vector is a linear combination of first base vectors, and weighting coefficients used in the linear combination of the first base vectors are first coefficients; on multiple frequency domain units contained in a CSI feedback band, a vector composed of first coefficients corresponding to a same first base vector is a linear combination of second base vectors, and weighting coefficients used in the linear combination of the second base vectors are second coefficients.

A precoding vector of each layer is represented as a linear combination of a set of codebook base vectors, and the set of codebook base vectors may be referred to as first base vectors. The terminal calculates weighting coefficients used in the linear combination according to the first base vectors, these weighting coefficient are first coefficients. For the precoding vector of this layer, the first coefficients in each frequency domain unit may form a matrix C, a transpose of each row vector in the matrix C or each column vector of a conjugate transpose matrix of the matrix C is written as a linear combination of a group of base vectors. The base vectors subjected to the linear combination are second base vectors, and weighting coefficient used when these second base vectors are subjected to the linear combination are second coefficients.

In an embodiment, the frequency domain unit includes at least one of: a sub-band, a resource block (RB) or a first RB set, and a number of RBs contained in the first RB set is less than a number of RBs contained in a sub-band of the CSI feedback band.

In a practical application, different frequency domain units may be selected to achieve compression feedback effects in different levels. The CSI feedback band may include multiple sub-bands, each sub-band is composed of several RBs, and RBs in each sub-band may be divided into different RB sets.

In some implementations of this embodiment, a second base vector is a DFT vector. It should be understood that in other implementations, the second base vector may also be a variation of the DFT vector, such as a Kronecker product of multiple DFT vectors, a cascade form of DFT vectors, or a phase adjustment form of the cascaded DFT vector.

In some implementations of this embodiment, a dimension of a second base vector is equal to a number of frequency domain units contained in the CSI feedback band.

In some implementations of this embodiment, when the frequency domain unit is the RB, all RBs contained in the CSI feedback band are divided into several second RB sets.

In a practical application, when the RB is used as the frequency domain unit to perform the compress and feedback, and the number of RBs contained in the CSI feedback band is relatively large, the dimension of the second base vector may be large. Therefore, the second base vector is selected in the space of a relatively large dimension, such that the decrease of correlation will result in a decrease of the feedback accuracy. Based on this, in this embodiment, the feedback is compressed after all RBs contained in the CSI feedback band are divided into RB sets.

In S102, the terminal feeds back CSI containing the PMI to a base station.

In this embodiment, the terminal feeds back the CSI to the base station, and the base station adjusts a radio signal that needs to be sent to the terminal according to the CSI, so as to achieve a better receiving effect on the terminal side. In a process of CSI feedback, the terminal receives a downlink signal, and this downlink signal carries a pilot. The terminal determines channel information according to the pilot contained in the received downlink signal, and this channel information may be represented as a channel matrix. The terminal selects a precoding matrix, which best matches with the current channel condition, from a codebook according to the determined channel information, and feeds back PMI corresponding to this precoding matrix to the base station through an uplink channel by means of a feedback link. The base station may determine the precoding matrix that should be used by the terminal according to the received PMI. It should be understood that, in addition to the PMI, the CSI fed back by the terminal may further contain a corresponding reported RI and a channel quality indicator (CQI), so that the base station determines a number of codewords, a number of layers and a modulation and coding scheme used by each codeword in the downlink transmission.

In an embodiment, the step in which the terminal feeds back the CSI containing the PMI to the base station includes a following step: the terminal feeds back second base vector information and second coefficient information corresponding to each second RB set to the base station; or, the terminal feeds back second coefficient information corresponding to each second RB set and second base vector information which is common to all second RB sets to the base station.

In some implementations of this embodiment, the terminal may feedback the corresponding second base vector information and second coefficient information for each second RB set respectively. In other implementations of this embodiment, the terminal may also feedback the corresponding second coefficient information for each second RB set respectively, and feedback same second base vector information for all RB sets contained in the CSI feedback band.

In an embodiment, a first coefficient on a second RB set is obtained based on a second coefficient and a second base vector corresponding to this second RB set.

In some implementations of this embodiment, a weighting coefficient of an lth first base vector on each of all RBs contained in a second RB set forms a vector cl, this vector cl is a linear combination of second base vectors corresponding to this second RB set, and weighting coefficients used in the linear combination are second coefficients corresponding to this second RB set.

In an embodiment, a dimension of a second base vector on a second RB set is equal to a number of RBs contained in this second RB set.

In an embodiment, each second RB set in the CSI feedback band has a same number of contained RBs.

In an embodiment, the second RB set satisfies at least one of: RBs in a second RB set are several consecutive RBs in the CSI feedback band; RBs in a second RB set are several RBs, which are distributed with a preset number of spacings, in the CSI feedback band; or, RBs in the second RB set are several RBs, which are distributed with the preset number of spacings, on a BWP where this second RB set is located.

In some implementations of this embodiment, each second RB set may include G consecutive RBs in the CSI feedback band. In other implementations, RBs contained in each second RB set may also be comb-like distributed RBs contained in the CSI feedback band. In still other implementations, RBs contained in each second RB set may also be comb-like distributed RBs in the bandwidth part (BWP).

In an embodiment, a number of second RB sets which are divided by the CSI feedback band is determined based on a total number of RBs contained in the CSI feedback band.

As an implementation of this embodiment, whether the total number of RBs contained in the CSI feedback band is greater than or equal to a preset threshold R0 is determined. If the total number of RBs contained in the CSI feedback band is greater than or equal to the preset threshold R0, the CSI feedback band is divided into M1 second RB sets. If the total number of RBs contained in the CSI feedback band is less than the preset threshold R0, the CSI feedback band is divided into M2 second RB sets. M1 and M2 are positive integers, M1 is greater than M2 and M2 is greater than or equal to 1.

In an embodiment, a dividing strategy used when the CSI feedback band is divided into second RB sets is determined based on sub-band distribution information of sub-bands contained in the CSI feedback band.

As an implementation of this embodiment, the dividing strategy may include that RBs on several consecutive sub-bands in the CSI feedback band are divided into a same second RB set, and RBs on each non-consecutive sub-band are divided into different second RB sets.

In an embodiment, a number of second RB sets which are divided by the CSI feedback band is determined based on a measured channel state information reference signal (CSI-RS).

In an embodiment, when the CSI includes a first portion and a second portion, the step in which the terminal feeds back the CSI containing the PMI to the base station include following steps: the terminal respectively feeds back the first portion of the CSI, which contains the number of second RB sets, and the second portion of the CSI to the base station. A feedback overhead of the second portion of the CSI is determined based on a value of the first portion of the CSI.

As an implementation of this embodiment, when CSI parameters are divided into the first portion and the second portion, the number M of second RB sets and parameters in the first portion of the CSI are jointly channel coded and fed back, and the overhead of CSI parameters in the second portion is determined by values of CSI parameters in the first portion.

In an embodiment, the method further includes following steps: whether the number of second RB sets which are divided by the CSI feedback band is greater than a preset threshold is determined; if the number of second RB sets which are divided by the CSI feedback band is greater than the preset threshold, it is determined to select K1 second base vectors; and if the number of second RB sets which are divided by the CSI feedback band is not greater than the preset threshold, it is determined to select K2 second base vectors; where K1 and K2 are positive integers, and K1 is less than K2.

As an implementation of this embodiment, when the number M of the second RB sets which are divided by the CSI feedback band is greater than M3, i.e., M>M3, the number of selected second base vectors is K1, and when the number M of the second RB sets which are divided by the CSI feedback band is less than or equal to M3, i.e., M≤M3, the number of selected second base vectors is K2; where K1<K2, and M3≥1.

In an embodiment, the second base vector information fed back by the terminal to the base station respectively corresponds to each piece of first base vector information.

As an implementation of this embodiment, for a precoding vector of a certain layer, the terminal respectively reports corresponding second base vector information for each first base vector reported to the base station.

In an embodiment, the second base vector information is determined in a differential encoding manner.

As an implementation of this embodiment, the step in which the second base vector information is determined in the differential encoding manner includes steps described below, second base vector information corresponding to lth first base vector information is obtained by differential encoding on second base vector information corresponding to 1st first base vector information, or, by differential encoding on second base vector information corresponding to (l−1)th first base vector information, where l is a positive integer greater than 1.

In an embodiment, the second base vector information fed back by the terminal to the base station simultaneously corresponds to all first base vector information.

As an implementation of this embodiment, for a precoding vector of a certain layer, the terminal reports same second base vector information for all first base vectors reported to the base station.

In an embodiment, a second base vector candidate set to which the second base vectors belong is determined based on a parameter O, and the second base vector candidate set is one of $\{v1, \ldots, vNO\}$ or a subset of $\{v1, \ldots, vNO\}$; O is a positive integer, and N is the number of frequency domain units contained in the CSI feedback band.

In this embodiment, an optional set of second base vectors is determined according to O, N is a number of first frequency domain units contained in the CSI feedback band or a number of RBs contained in the second RB set, and the optional set of second base vectors is {v1, ..., vNO} or its subset, where an Sth vector vS is:

$$\left[ 1 \quad \exp(j\frac{s}{NO}2\pi) \quad \ldots \quad \exp(j\frac{(N-1)s}{NO}2\pi) \right],$$

or, a transpose of this vector and/or conjugation of this vector.

In an embodiment, the manner of determining the configuration parameter O includes, but is not limited to: O is determined according to base station configuration signaling, or, O is determined according to a measured CSI-RS.

When CSI parameters are divided into the first portion and the second portion, O and parameters in the first portion of the CSI are jointly channel coded and fed back, and the overhead of CSI parameters in the second portion is determined by values of O and CSI parameters in the first portion of the CSI.

In an embodiment, when the second base vector candidate set is a subset of {v1, ..., vNO}, a manner of determining the second base vector candidate set includes at least one of: determining bits having a value of 1 in a bit map with a length of NO configured by the base station configuration signaling as the second base vector candidate set in {v1, ..., vNO}; determining the second base vector candidate set based on a starting position of the second base vector candidate set configured according to the base station configuration signaling and the number of vectors in the second base vector candidate set; or determining a target orthogonal vector group composing the second base vector candidate set and optional vectors in the target orthogonal vector group from several orthogonal vector groups in {v1, ..., vNO} according to the base station configuration signaling; where mutually orthogonal vectors belong to a same orthogonal vector group.

The base station configures an optional set of second base vectors to be a subset of {v1, ..., vNO} through signaling, and in an implementation of this embodiment, the base station configures the bit map with the length of NO, where bits having a value of 1 represents that a vector in {v1, ..., vNO} corresponding to positions where these bits are located are optional second base vectors, and a bit with a value of 0 represents that a vector in {v1, ..., vNO} corresponding to a position where this bit is located is a non-optional second base vector.

In another implementation of this embodiment, the base station configures the starting position $s_{start}$ of the optional set of second base vectors and the number $s_{length}$ of optional sets of second base vector, and in {v1, ..., v$_{NO}$}, {v$_{s_{start} \bmod NO}$, ..., v$_{(s_{start}+s_{length}) \bmod NO}$} is the optional base vector candidate set In an embodiment, the second base vectors include mutually orthogonal vectors contained in a target orthogonal vector group selected from several orthogonal vector groups in the second base vector candidate set.

In some implementations of this embodiment, {v1, ..., vNO} is divided into multiple orthogonal vector groups, where mutually orthogonal vectors are divided into one group. The base station configures the optional orthogonal vector group and optional vectors selected from the optional orthogonal vector group through signaling. The terminal reports an index of the selected orthogonal vector group and index information about K second base vectors in the corresponding orthogonal vector group.

In an embodiment, the second base vectors are consecutive vectors contained in the selected target consecutive vector group from several consecutive vector groups containing consecutive base vectors in the second base vector candidate set.

In some implementations of this embodiment, the optional set {v1, ..., vNO} is divided into multiple vector groups, and each group contains K consecutive base vectors. The terminal reports an index of the selected vector group, and K vectors contained in this group are the selected second base vectors.

In some implementations of this embodiment, in multiple vector groups, an mth group is {v$_{(m-1)d+1 \bmod NO}$, v$_{(m-1)d+2 \bmod NO}$, ..., v$_{(m-1)d+K \bmod NO}$}, where d is a positive integer less than or equal to K, and d may be determined according to base station signaling or in an agreed manner, m has a value range including integers from 1 to $$\left\lceil \frac{NO}{d} \right\rceil,$$

the terminal reports the value of m, and the selected K second base vectors are vectors contained in the mth group.

The second vector information includes a vector group index of a selected vector group, or a vector group index of a selected vector group and a vector index of a vector selected from the selected vector group. When the frequency domain unit is the RB and all RBs contained in the CSI feedback band are divided into several second RB sets, the step in which the terminal feeds back the CSI containing the PMI to the base station includes a following step: the terminal feeds back a same vector group index to the base station for multiple second RB sets in the CSI feedback band; or, the terminal feeds back a same vector group index to the base station for all second RB set in the CSI feedback band, and a vector index corresponding to each second RB set respectively.

In an embodiment, the second base vectors are K base vectors selected from X consecutive base vectors in the second base vector candidate set; where X and K are positive integers.

In some implementations of this embodiment, the optional set {v1, ..., vNO} is divided into multiple vector groups, and each group includes X consecutive base vectors. The terminal reports an index of a selected vector group, and reports information corresponding to K second base vectors selected from this selected vector group.

The terminal reports one vector group index for all second RB sets contained in the CSI feedback band, and reports information corresponding to K second base vectors selected from this selected vector group for each second RB set.

In some implementations of this embodiment, in multiple vector groups, an mth group is {v$_{(m-1)d+1 \bmod NO}$, v$_{(m-1)d+2 \bmod NO}$, ..., v$_{(m-1)d+X \bmod NO}$} where d is a positive integer less than or equal to X, and d may be determined according to base station signaling or in an agreed manner, m has a value range including integers from 1 to $$\left\lceil \frac{NO}{d} \right\rceil,$$

and the terminal reports the value of m, and reports information corresponding to K second base vectors selected form the mth base vector group.

In an embodiment, the second base vectors are vectors intercepted from a DFT vector with a corresponding length generated based on the number of frequency domain units contained in a downlink BWP according to configuration information of the CSI feedback band.

The terminal generates the DFT vector with the corresponding length according to the number of first frequency domain units contained in the downlink BWP corresponding to the CSI, and intercepts and forms the second base vectors from the DFT vector according to the first frequency domain units contained in the CSI feedback band.

In some implementations of this embodiment, if the downlink BWP contains N0 frequency domain units, a DFT vector with a length of N0 is generated, there is a one-to-one mapping between each element in the DFT vector and the N0 frequency domain units, and the CSI feedback band contains N1 frequency domain units of the N0 frequency domain units, where N1≤N0, the second base vectors intercepted from the DFT vector consist of elements mapped by the frequency domain units contained in the CSI feedback band.

In an embodiment, when the frequency domain unit is a unit less than one sub-band, the channel quality indicator (CQI) of a sub-band contained in the CSI is determined according to precoding vectors corresponding to all frequency domain units contained in each sub-band.

In this embodiment, when the frequency domain unit is less than one sub-band, the sub-band CQI is calculated according to precoding corresponding to all frequency domain units contained in each sub-band.

In an embodiment, the step in which the terminal feeds back the CSI containing the PMI to the base station includes following steps: after quantizing two components of the second coefficient amplitude information in the PMI to be between 0 and 1, the terminal feeds back the two quantized components to the base station; the second coefficient amplitude information is a product of the two components, and the two components include a first amplitude component and a second amplitude component.

In some implementations of this embodiment, the terminal feeds back a common second amplitude component for multiple pieces of second coefficient amplitude information corresponding to a common first base vector, and/or, the terminal feeds back a common second amplitude component for multiple pieces of second coefficient amplitude information corresponding to a common second base vector.

In an embodiment, the step in which the terminal feeds back the CSI containing the PMI to the base station includes a following step: the terminal feeds back two components of the second coefficient phase information in the PMI to the base station, and the two components include a first phase component and a second phase component.

In some implementations of this embodiment, the second phase component is a product of the two components or a sum of the two components. In other implementations of this embodiment, a value of the first phase component in the second coefficient phase information is determined according to a value of the second phase component. Furthermore, the second coefficient phase information may be equal to the value of the first phase component.

In other implementations of this embodiment, the terminal feeds back a common second phase component for multiple pieces of second coefficient phase information corresponding to a common first base vector, and/or, the terminal feeds back a common second phase component for multiple pieces of second coefficient phase information corresponding to a common second base vector.

Through the CSI feedback method provided by this embodiment, in some implementation processes, the terminal determines the PMI, the PMI includes the first base vector information, second base vector information and second coefficient information, and the second coefficient information includes second coefficient amplitude information and/or second coefficient phase information; precoding vectors corresponding to frequency domain resources in a preset frequency domain unit are the same, a precoding vector is a linear combination of first base vectors, and weighting coefficients used in the linear combination of the first base vectors are first coefficients; on frequency domain units contained in a CSI feedback band, a vector composed of the first coefficients corresponding to a same first base vector is a linear combination of second base vectors, and weighting coefficients used in the linear combination of the second base vectors are second coefficients; and the terminal feeds back CSI containing the PMI to a base station. The CSI feedback is performed after frequency domain and spatial domain channel coefficients are compressed, thereby enduring the high CSI feedback performance while reducing the CSI feedback overhead.

Embodiment Two

Figure 2:
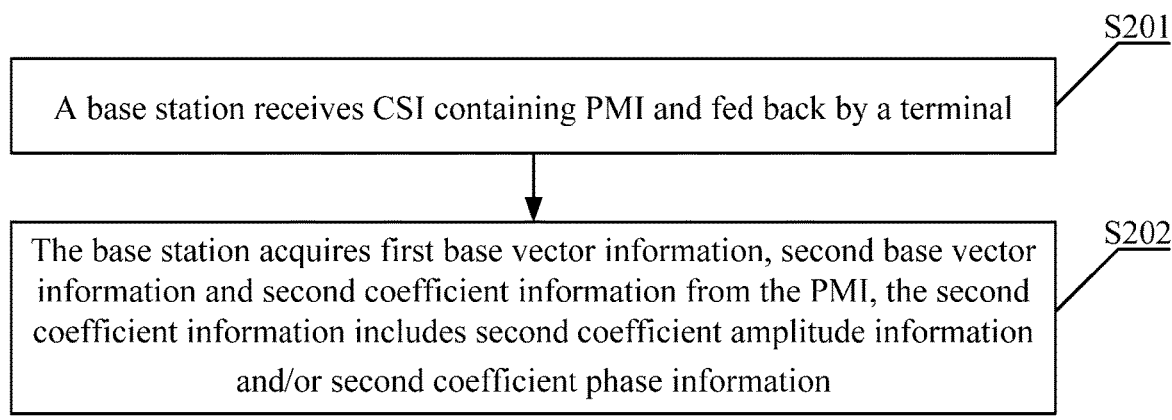
FIG. 2 is a flowchart of a CSI receiving method applied on a base station side according to an embodiment two of the present disclosure.

In order to resolve the problem in the related art that the CSI feedback overhead is large when the CSI is precisely fed back, this embodiment provides a CSI receiving method. The CSI receiving method provided by this embodiment is applied on a base station side, as shown in FIG. 2, the method includes steps described below.

In S201, a base station receives CSI containing PMI and fed back by a terminal.

In this embodiment, the base station receives the CSI sent by the terminal, and adjusts a radio signal that needs to be sent to the terminal according to this CSI, so as to achieve a better receiving effect on the terminal side. The terminal determines channel information according to a pilot contained in the received downlink signal, selects a precoding matrix that matches with the current channel condition from a codebook, and feeds back the PMI corresponding to this precoding matrix to the base station through an uplink channel by means of a feedback link. The base station may determine a precoding matrix used on the terminal according to the received PMI. It should be understood that, in addition to the PMI, the CSI received by the base station fed back by the terminal may further include a corresponding RI and CQI, so that the base station determines a number of codewords of the downlink transmission, a number of layers and a modulation and coding scheme used by each codeword.

In S202, the base station acquires first base vector information, second base vector information and second coefficient information from the PMI, the second coefficient information includes second coefficient amplitude information and/or second coefficient phase information; precoding vectors corresponding to frequency domain resources in a preset frequency domain unit are the same, a precoding vector is a linear combination of first base vectors, and weighting coefficients used in the linear combination of the first base vectors are first coefficients; on multiple frequency domain units contained in a CSI feedback band, a vector composed of first coefficients corresponding to a same first base vector is a linear combination of second base vectors, and weighting coefficients used in the linear combination of the second base vectors are second coefficients.

A precoding vector of each layer is represented as a linear combination of a set of codebook base vectors, and the set of codebook base vectors may be referred to as first base vectors. The terminal calculates weighting coefficients used in the linear combination according to the first base vectors, these weighting coefficients are first coefficients. For the precoding vector of this layer, the first coefficients in each frequency domain unit may form a matrix C. The transpose of each row vector in the matrix C or each column vector of a conjugate transpose matrix of the matrix C is written as a linear combination of a group of base vectors. The base vectors subjected to the linear combination are second base vectors, and weighting coefficients used when the second base vectors are subjected to the linear combination are second coefficients.

In an embodiment, the frequency domain unit includes at least one of: a sub-band, a resource block (RB) or a first RB set, and a number of RBs contained in the first RB set is less than a number of RBs contained in a sub-band in the CSI feedback band.

In a practical application, different frequency domain units may be selected to achieve compression feedback effects in different levels. The CSI feedback band may contain multiple sub-bands, each sub-band is composed of several RBs, and RBs in each sub-band may be divided into different RB sets.

In some implementations of this embodiment, a second base vector is a DFT vector. It should be understood that in other implementations, the second base vector may also be a variation of the DFT vector, such as a Kronecker product of multiple DFT vectors, a cascade form of DFT vectors, or a phase adjustment form of the cascaded DFT vector.

In some implementations of this embodiment, a dimension of the second base vector is equal to a number of frequency domain units contained in the CSI feedback band.

In some implementations of this embodiment, when the frequency domain unit is the RB, all RBs contained in the CSI feedback band are divided into several second RB sets.

In a practical application, when the terminal performs the compress and feedback by using the RB as the frequency domain unit, and the number of RBs contained in the CSI feedback band is relatively large, the dimension of the second base vector may be very large. Therefore, the second base vector is selected from the space of a relatively large dimension, such that the decrease of correlation will result in the decrease of the feedback accuracy. Based on this, in this embodiment, the terminal performs the compress and feedback, after all RBs contained in the CSI feedback band are divided into RB sets.

In some implementations of this embodiment, the step in which the base station receives the CSI containing the PMI and fed back by the terminal includes, but is not limited to, following two steps: the base station receives second base vector information and second coefficient information corresponding to each second RB set fed back by the terminal, or the base station receives second coefficient information corresponding to each second RB set fed back by the terminal and second base vector information which is common to all second RB sets.

In some implementations of this embodiment, each second RB set satisfies at least one of: RBs in each second RB set are several consecutive RBs in the CSI feedback band; RBs in each second RB set are several RBs, which are distributed with a preset number of spacings, in the CSI feedback band; or RBs in each second RB set are several RBs, which are distributed with a preset number of spacings, on a BWP where this second RB set is located.

In some implementations of this embodiment, the second base vector information received by the base station and fed back by the terminal corresponds to each first base vector information respectively, or, the second base vector information received by the base station and fed back by the terminal corresponds to all pieces of first base vector information.

The step in which the base station receives the CSI containing the PMI and fed back by the terminal includes, but is not limited to, following two steps: after the terminal quantizes two components of the second coefficient amplitude information to be between 0 and 1, the base station receives the two quantized components fed back by the terminal, where the second coefficient amplitude information is a product of the two components, and the two components include a first amplitude component and a second amplitude component; and/or, the base station receives the two components of the second coefficient phase information fed back by the terminal, and the two components include a first phase component and a second phase component.

Through the CSI receiving method provided by this embodiment, in some implementation processes, the base station receives CSI containing PMI and fed back by the terminal, and the base station receives the first base vector information, second base vector information and second coefficient information from the PMI, where the second coefficient information includes the second coefficient amplitude information and/or second coefficient phase information; precoding vectors corresponding to frequency domain resources in a preset frequency domain unit are the same, a precoding vector is a linear combination of first base vectors, and weighting coefficients used in the linear combination of the first base vectors are first coefficients; on frequency domain units contained in a CSI feedback band, a vector composed of first coefficients corresponding to a same first base vector are a linear combination of second base vectors, and weighting coefficients used in the linear combination of the second base vectors are second coefficients. The terminal feeds back the CSI after compressing frequency domain and spatial domain channel coefficients, thereby enduring that the CSI received by the base station has high quantization precision while reducing the CSI feedback overhead.

Embodiment Three

To better understand the present application, this embodiment will illustrate the CSI feedback method at the sub-band level in detail with a specific example.

A number of columns of the precoding matrix fed back by the terminal is a channel rank, i.e., RI. A precoding vector of each layer is represented as a linear combination of a set of codebook base vectors, and the set of codebook base vectors may be referred to as first base vectors. The terminal calculates weighting coefficients used in the linear combination according to the first base vectors, quantizes and feeds back amplitude information and phase information of the weighting coefficients, and these weighting coefficients may be referred to as first coefficients. In order to improve the feedback performance, the amplitude information and phase information of the first coefficients usually need to be reported according to a sub-band. The sub-band is a frequency domain granularity. For all RBs contained in the CSI feedback band, M consecutive RBs form one sub-band. In this way, the CSI feedback band may contain N sub-bands having a size of M.

On an nth sub-band fed back by the terminal, the precoding vector of a certain layer may be expressed as follows:

$$f_n = W_1 c_n$$

$W_1$ is a first base vector, for example, consists of a set of orthogonal DFT vectors or a Kronecker product of DFT vectors, and $c_n$ is a vector composed of first coefficients. In general, the information in $W_1$ is fed back by a wideband, that is, for different sub-bands over the entire CSI feedback band, the information in $W_1$ is the same. Specifically, the number of base vectors contained in $W_1$ is L, that is, the number of columns of $W_1$ is L. For example, $W_1$ is a block diagonal matrix, and the vectors contained in the diagonal block are orthogonal DFT vectors or the Kronecker products of DFT vectors. For the precoding vector of this layer, first coefficients on each sub-band are combined into a following matrix C.

$$C = \begin{bmatrix} c_{11} & \cdots & c_{1N} \\ \vdots & \ddots & \vdots \\ c_{L1} & \cdots & c_{LN} \end{bmatrix}$$

When the amplitude information and phase information of elements in the matrix C are directly quantified and fed back, it will bring a relatively large feedback overhead, using the compression feedback method at the sub-band level according to the present solution can reduce the CSI feedback overhead while ensuring the high performance.

The transpose of each row vector in the matrix C or each column vector of a conjugate transpose matrix of the matrix C is written as a linear combination of a group of base vectors. For example, when the transpose of an $l^{th}$ row vector in the matrix C or an $l^{th}$ column vector of the conjugate transposed matrix of the matrix C is $b_l$, $b_l$ is written as a linear combination of a group of base vectors, shown as follows:

$$b_l = D_l a_l$$

$b_l$ is an N-dimensional vector, and vectors contained in $D_l$ are the base vectors and called the second base vectors. This group of second base vectors totally includes K vectors. $a_l$ is a K-dimensional vector and includes weighting coefficients of K second base vectors, and these coefficients are called the second coefficients. The terminal feeds back the second base vector information, and the amplitude information and phase information of the second coefficients.

It should be noted that there are several factors to be taken into consideration in the selection of the second base vectors, i.e., the vectors in $D_l$.

In some implementations of this embodiment, the second base vectors are composed of DFT vectors. The more specific manner for selecting the second base vector includes, but is not limited to, at least one of following manners.

In a manner A-1, for a precoding vector of a certain layer, the terminal reports corresponding second base vector information for each reported first base vector.

When the second base vector is selected according to the above manner, the terminal may feedback different D1 for different l. In an optimized example, at least one of following manners may be further used.

In a sub-manner A-1-1, the terminal respectively and independently encodes and reports corresponding second base vector information for each reported first base vector. Specifically, for each l, the terminal independently feeds back second base vector information contained in the D1. For example, for each l, the terminal reports an indication $i_l = \{i_l^{(1)}, \ldots, i_l^{(K)}\}$ for a group of second base vectors, where each parameter in il represents one second base vector. For example, $i_l^{(K)}$ indicates a DFT vector, $$\begin{bmatrix} 1 & \exp\left(j\theta_{i_l^{(k)}}\right) & \cdots & \exp\left(j(N-1)\theta_{i_l^{(k)}}\right) \end{bmatrix}^T.$$

embodiment, $$\theta_{i_l^{(k)}}$$

has a value range of [0, 2π].

In a sub-manner A-1-2, for each reported first base vector, the terminal respectively reports the corresponding second base vector information through differential encoding. Specifically, the terminal feeds back second base vector information contained in D1 respectively for each l. For l>1, the second base vector information fed back corresponding to an lth first base vector is obtained by differential encoding on a second base vector corresponding to a 1st first base vector, or by differential encoding on a second base vector corresponding to an (l–1)th first base vector. For example, for l=1, the terminal reports an indication $i_l = \{i_l^{(1)}, \ldots, i_l^{(K)}\}$ for a group of second base vectors, where each parameter in il $i_1$ represents one second base vector. For example, $i_l^{(k)}$ indicates a DFT vector $$\begin{bmatrix} 1 & \exp\left(j\theta_{i_l^{(k)}}\right) & \cdots & \exp\left(j(N-1)\theta_{i_l^{(k)}}\right) \end{bmatrix}^T.$$

For l>1, the terminal reports an indication $i_l = \{i_l^{(1)}, \ldots, i_l^{(K)}\}$ for the group of second base vectors, where $i_l^{(k)}$ indicates a DFT vector $$\begin{bmatrix} 1 & \exp\left(j\left(\theta_{i_1^{(k)}} + \delta_{i_l^{(k)}}\right)\right) & \cdots & \exp\left(j(N-1)\left(\theta_{i_1^{(k)}} + \delta_{i_l^{(k)}}\right)\right) \end{bmatrix}^T.$$

In an embodiment, $$\delta_{i_l^{(k)}}$$

has a value range of [0, 2π].

In some embodiments, for l=1, the terminal reports the indication $i_l = \{i_l^{(1)}, \ldots, i_l^{(K)}\}$ for the group of second base vectors, where each parameter in it represents one second base vector. For example, $i_l^{(k)}$ indicates a DFT vector $$\begin{bmatrix} 1 & \exp\left(j\theta_{i_l^{(k)}}\right) & \cdots & \exp\left(j(N-1)\theta_{i_l^{(k)}}\right) \end{bmatrix}^T.$$

For l>1, the terminal reports an indication $i_l$ for the group of second base vectors, and a kth second base vector is a DFT vector shown as follows:

$$\left[ 1 \quad \exp\left(j\left(\theta_{i_1^{(k)}} + \delta_{i_l}\right)\right) \quad \cdots \quad \exp\left(j(N-1)\left(\theta_{i_1^{(k)}} + \delta_{i_l}\right)\right) \right]^T$$

In a manner A-2, for precoding of a certain layer, the terminal reports a group of corresponding second base vector information for all reported first base vectors, that is, all reported first base vectors use a same group of second base vectors. For the precoding of a certain layer, the terminal only reports indication information of the group of second base vectors, i.e., $i=\{i_1, i_2, \ldots, i_K\}$, where $i_k$ represents a DFT vector shown as follows:

$$[1 \quad \exp(j\theta_{i_k}) \ldots \exp(j(N-1)\theta_{i_k})]^T$$

Each vector in $D_l = D$ is a DFT vector indicated by each element in i. The final matrix C may be written as $C^T = DA$ or $C^H = DA$, where $A = \{a_1, \ldots, a_L\}$.

On the other hand, the manner for determining an optional set of vectors in D or Dl includes, but is not limited to, at least one of the following manners.

In a manner B-1, the optional set of vectors is determined according to base station configuration signaling. The more specific manner may include, but is not limited to, at least one of the following sub-manners.

In a sub-manner B-1-1, the base station configuration signaling configures a parameter O, and the optional set of second base vectors is $\{v_1, \ldots, v_{NO}\}$, where an $s^{th}$ vector $v_s$ is $$v_s = \left[ 1 \quad \exp\left(j\frac{s}{NO}2\pi\right) \quad \cdots \quad \exp\left(j\frac{(N-1)s}{NO}2\pi\right) \right]^T.$$

In a sub-manner B-1-2, for a certain parameter O, the base station configures a set of DFT vectors which may be selected as the second base vectors. For example, the base station configures a bit map with a length of NO, where a bit having a value of 1 represents that a vector in $\{v_1, \ldots, v_{NO}\}$ corresponding to a position where this bit having a value of 1 is located may be used as a candidate vector of the second base vectors. In another example, the base station configures a starting position sstart of an optional DFT vector and a number slength of optional DFT vectors, then in $\{v_1, \ldots, v_{NO}\}$, $\{v_{s_{start} \bmod NO}, \ldots, v_{(s_{start}+s_{length}) \bmod NO}\}$ is an optional base vector candidate set. In other embodiments, $\{v_1, \ldots, v_{NO}\}$ is divided into multiple orthogonal vector groups, in which mutually orthogonal vectors are divided into one group, and the base station configures an optional vector group and optional vectors in the selected orthogonal vector group through the signaling.

In a manner B-2, the optional set of vectors is determined according to an agreed rule. For example, in the above manner B-1-1, the parameter O has a fixed value, for example, O=4 or O=1, or the value of the parameter O is determined according to a value of L.

In a manner B-3, the terminal determines the value of O according to channel measurement. After the terminal determines the value of O according to the channel measurement, the second base vector candidate set is $\{v_1, \ldots, v_{NO}\}$. The terminal reports the value of O, the reported O, RI, and a CQI corresponding to a first codeword are used as joint channel coding of a first CSI portion, and the other CSI parameters are as joint channel coding of a second CSI portion, where values of parameters of the first CSI portion determine the feedback overhead of the second CSI portion.

On the other hand, the manner for selecting second base vectors from the second base vector candidate set includes, but is not limited to, at least one of following manners.

In a manner C-1, K selected second base vectors are mutually orthogonal. Specifically, the optional second base vectors are divided into multiple vector groups, and every two DFT vectors in each group are mutually orthogonal. For example, the optional second base vectors ar divided into O groups: $\{v_t, v_{O+t}, v_{2O+t}, \ldots, v_{(N-1)O+t}\}$, where t denotes a group index, and a value oft is $\{1, 2, \ldots, O\}$. The terminal reports a group index t selected by itself, and index information of K second base vectors in the corresponding orthogonal group.

In a manner C-2, selected second base vectors are K consecutive second base vectors in the candidate set. Specifically, the candidate set $\{v_1, \ldots, v_{NO}\}$ is divided into multiple vector groups, and each group contains K consecutive second base vectors. For example, an mth group is $\{v_{(m-1)d+1 \bmod NO}, v_{(m-1)d+2 \bmod NO}, \ldots, v_{(m-1)d+K \bmod NO}\}$, where d is a positive integer less than or equal to K, and d may be determined according to base station signaling or in an agreed manner, for example, d has an integer value obtained from dividing K by 2, and m has a value range including integers from 1 to $$\left\lceil \frac{RO}{d} \right\rceil.$$

The terminal reports the value of m, and the selected K second base vectors are the mth group of base vectors.

In a manner C-3, selected second base vectors are K base vectors selected from X consecutive second base vector in the candidate set. Specifically, the candidate set $\{v_1, \ldots, v_{NO}\}$ is divided into multiple vector groups, and each group contains X consecutive second base vectors. For example, an mth group is $\{v_{(m-1)d+1 \bmod NO}, v_{(m-1)d+2 \bmod NO}, \ldots, v_{(m-1)d+K \bmod NO}\}$, where d is a positive integer less than or equal to X and d may be determined according to base station signaling or in an agreed rule, for example, d has a value of X, or an integer value obtained from dividing K by 2, and m has a value range including integers from 1 to $$\left\lceil \frac{NO}{d} \right\rceil.$$

The terminal reports the value of m and information corresponding to K second base vectors selected from the mth group of base vectors. The value of X may be determined in an agreed manner or by base station configuration signaling such as codebook limitation signaling.

In addition, since the CSI feedback band may contain non-consecutive sub-bands, in this case, if the full DFT vector generated by the CSI feedback band is still used for second base vectors, the advantages of the DFT vector cannot be utilized, and thus second base vectors may be generated by using a following method.

In a manner D, a DFT vector with a corresponding length is generated according to the number of sub-bands contained in the downlink BWP corresponding to the CSI, and the second base vectors are intercepted from this DFT vector according to the configuration of the CSI feedback band.

Figure 3:
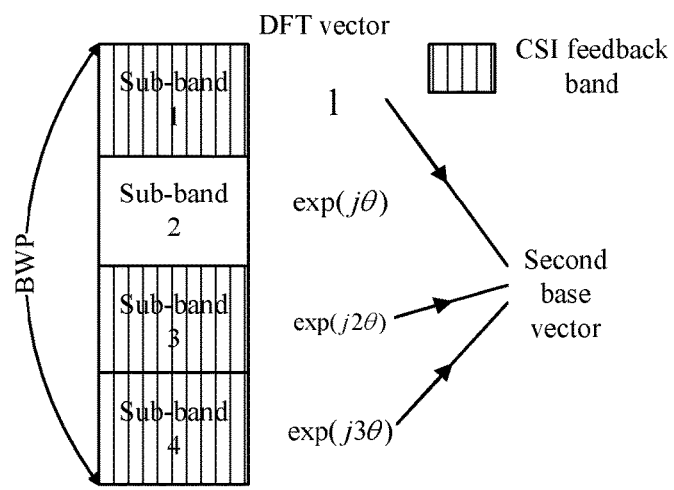
FIG. 3 is a schematic diagram of intercepting second base vectors from a bandwidth part (BWP) according to an embodiment three of the present disclosure.

Specifically, as shown in FIG. 3, if the downlink BWP contains N0 sub-bands, a DFT vector with a length of N0 is generated, i.e., $v_0=\{v_0^{(1)}, \ldots, v_0^{(N0)}\}^T$. There is a one-to-one mapping between each element in the DFT vector and the N0 sub-bands. The CSI feedback band contains N sub-bands of the N0 sub-bands, where N≤N0. The intercepted second base vectors consist of elements corresponding to the sub-bands contained in the CSI feedback band.

For the quantization feedback of the second coefficient information in the sub-band level CSI feedback method, i.e., the quantization feedback of $\{a_1, \ldots, a_L\}$, for precoding of a certain layer, each vector $a_l$ is a K-dimensional vector including weighting coefficients for a linear combination of the second base vectors, where the linear combination is to generate the vector consisting of weighting coefficients of an lth first base vector in linear combinations of the first base vectors on N sub-bands. The second coefficients to be fed back form a following matrix.

$$A=[a_1, \ldots, a_L]$$

The feedback of the second coefficient information in the above matrix A requires quantified feedback of amplitude information and phase information of elements in the matrix. The specific manner for quantization feedback includes, but is not limited to, at least one of following manners.

In a manner E-1, the terminal quantifies the second coefficient amplitude information to be between 0 and 1, and feeds back the quantified second coefficient amplitude information.

In some embodiments, for the matrix A, calculated second coefficients in the precoding of a certain layer are divided by a maximum value of amplitude of the second coefficients, i.e., $$A' = \frac{1}{M_W}A,$$

where $M_W$ is the maximum value of amplitude of the elements in the matrix A. The terminal quantifies the amplitude of each element in the A' to be between 0 and 1 and feeds back each quantified amplitude served as the second coefficient amplitude information to the base station.

In a manner E-2, the terminal feeds back information of two components of the second coefficient amplitude. A first component of the second coefficient amplitude and a second component of the second coefficient amplitude are quantified to be between 0 and 1. The second coefficient amplitude used in the precoding is a product of the two components. Furthermore, for a certain first base vector, i.e., for a certain l, two components of corresponding K second coefficient amplitudes are the same; or for a certain second base vector, i.e., for each row in the matrix A, two components of corresponding L second coefficient amplitudes are the same.

In some embodiments, for the matrix A, the matrix A' is obtained from dividing each element in the matrix A by the maximum value of amplitude in a row or a column where the each element is located. The amplitude of the element in the matrix A' is quantified to be between 0 and 1, and the quantized amplitude of the element served as the first component of the second coefficient amplitude is fed back to the base station. In addition, after the terminal divides the maximum value of amplitude in each row or each column by the maximum value of the amplitude of all elements in the matrix A, the terminal quantifies the obtained values to be between 0 and 1, and feeds back the quantified values served as the second component of the second coefficient amplitude to the base station. Finally, the second coefficient amplitude used in the precoding is obtained based on a product of the corresponding first component and second component of the second coefficient amplitude.

For the phase quantization of the second coefficient, the performance of the quantization may also be improved by using a two-step quantization method. The specific quantization feedback includes, but is not limited to, at least one of following manners.

In a manner F-1, the terminal feeds back information of two components of the second coefficient phase. The second component represents a variation range of phase of elements in each row or each column of the matrix A, for example, the maximum value of phase, one of these second components is fed back for each row or each column, i.e., second coefficient phases contained in a certain row or column of the matrix A vary within a range of 0 to this maximum value of phase. These calculated phases of elements in the matrix A are quantified into first components of corresponding second coefficient phases, and each first component has a value range of 0 to this maximum value of phase. Finally, a quantified second coefficient phase is equal to the first component of this second coefficient phase.

In a manner F-2, the terminal feeds back information about two components of the second coefficient phase. The second component represents phase variation feedback of each row or column of the matrix A, for example, the maximum value of phase, one of these second components is fed back for each row or column, i.e., second coefficient phases contained in a certain row or column of the matrix A vary within a range of 0 to this maximum value of phase. Ratios or differences between phases of elements in the matrix A and the above second components are obtained according to the calculated second coefficient phases in the matrix A. These obtained ratios or differences are quantified into first components of the second coefficient phases. Finally, a quantified second coefficient phase is a product or sum of the first component and the second coefficient.

Embodiment Four

To better understand the present application, this embodiment will illustrate the CSI feedback method at the RB level in detail with a specific example.

A number of columns of the precoding matrix fed back by the terminal is a channel rank, i.e., RI. A precoding vector of each layer is represented as a linear combination of a set of codebook base vectors, and this set of codebook base vectors may be referred to as first base vectors. The terminal calculates weighting coefficient used in the linear combination according to the first base vectors, and quantizes and feeds back amplitude information and phase information of the weighting coefficients, and these weighting coefficients may be referred to as first coefficients. The CSI feedback band is assumed to contain R RBs. If precoding is performed at the RB level, and a linear combination is used to represent the precoding on each RB, for a certain layer, a precoding vector on an rth RB may be represented as follows.

$$f_r=W_1c_r$$

$W_1$ is a first base vector, for example, consists of a set of orthogonal DFT vectors or Kronecker products of DFT vectors, and $c_r$ is a vector composed of first coefficients. In general, the information in $W_1$ is fed back by a wideband, that is, for different RBs over the entire CSI feedback band, the information in $W_1$ is the same. Specifically, a number of base vectors contained in $W_1$ is L, that is, the number of columns of $W_1$ is L. For example, $W_1$ is a block diagonal matrix, and vectors contained in this diagonal block are orthogonal DFT vectors or Kronecker products of DFT vectors. For a precoding vector of this layer, first coefficients on each RB are combined into a following matrix C.

$$C = \begin{bmatrix} c_{11} & \cdots & c_{1R} \\ \vdots & \ddots & \vdots \\ c_{L1} & \cdots & c_{LR} \end{bmatrix}$$

When the amplitude information and phase information of elements in the matrix C are directly quantified and fed back, it will bring a relatively large feedback overhead. On the basis of the above, in this embodiment, a transpose of each row vector in the matrix C or each column vector in a conjugate transpose matrix of the matrix C is written as a linear combination of a group of base vectors. For example, when the transpose of an lth row vector or an lth column vector of the conjugate transposed matrix of the matrix C is $b_l$, $b_l$ is written as a linear combination of a group of base vectors, shown as follows:

$$b_l = D_l a_l$$

$b_l$ is an R-dimensional vector, and vectors contained in $D_l$ are the base vectors and called the second base vectors. This set of second base vectors totally contains K vectors. $a_l$ is a K-dimensional vector and includes weighting coefficients of K second base vectors, and these coefficients are called second coefficients. The terminal feeds back the second base vector information, and the amplitude information and phase information of the second coefficients.

In some embodiments, the base station and the terminal may determine to use a compression solution at the sub-band level or a compression solution at the RB level through configuration signaling and an agreed rule. The agreed rule includes a rule based on a density of an associated CSI-RS. For example, if the density of the CSI-RS is greater than or equal to 1, the sub-band level compression method or the RB-level compression method may be used, but if the density of the CSI-RS is less than 1, only the sub-band level compression method may be used.

In addition, in some embodiments, when the CQI is fed back in a sub-band mode, a CQI of a sub-band is calculated based on pre-coding of all RBs contained in this sub-band.

For the RB-level compression feedback solution, in a practical application, when there may be a lot of RBs contained in the CSI feedback band, the dimensionality of the second base vector may be very large. Therefore, the second base vectors are selected from the space of a relatively large dimension, such that a decrease of correlation will result in a decrease of the accuracy. The performance of RB-level compression and feedback may be further optimized by using, but are not limited to, at least one of following manners:

In a manner A-1, RBs in the CSI feedback band are divided into M RB sets, where M>1. The terminal respectively feeds back corresponding second base vector information and second coefficient information for each RB set, and the precoding on each RB set is obtained by the product of a second base vector corresponding to the each RB set and a second coefficient corresponding to the each RB set. The dimension of a second base vector on each RB set is equal to a number of RBs contained in the each RB set.

Specifically, R RBs in the CSI feedback band are divided into M RB sets, each RB set includes G consecutive RBs, where $$G = \frac{R}{M}.$$

Figure 4:
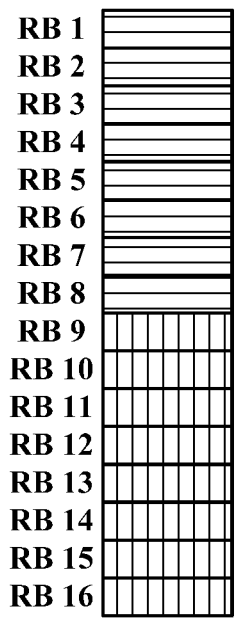
FIG. 4 is a schematic diagram of RB set division according to an embodiment four of the present disclosure.

If R/M is not an integer, RB sets from a 1st RB set to an (M−1)th RB set each contain $\lceil R/M \rceil$ RBs, and remaining RBs belong to an Mth RB set. FIG. 4 illustrates a specific example of diving RB sets. For the mth RB set, the precoding on a gth RB is shown as follows:

$$f_m^{(g)} = W_1 c_m^{(g)}$$

m is an integer between 1 and M, g is an integer between 1 and G. The first coefficients on this RB set form a following matrix $C_m$.

$$C_m = \begin{bmatrix} c_m^{(1)}(1) & \cdots & c_m^{(G)}(1) \\ \vdots & \ddots & \vdots \\ c_m^{(1)}(L) & \cdots & c_m^{(G)}(L) \end{bmatrix}$$

A transpose of an $l^{th}$ row vector in the matrix $C_m$ or an $l^{th}$ column vector of a conjugate transposed matrix of the matrix $C_m$ is $b_l^m$, and $b_l^m$ is a linear combination of a group of second base vectors, shown as follows:

$$b_l^m = D_l^m a_l^m$$

The terminal feeds back a second base vector $D_l^m$ corresponding to each RB set and the amplitude information and phase information of the second coefficient $a_l^m$.

In an embodiment, only when the number of RBs in the CSI feedback band is greater than or equal to a threshold R0, multiple RB sets are divided, otherwise there is only one RB set.

In an embodiment, the manner for dividing RB sets is related to the sub-bands contained in the CSI feedback band. Consecutive sub-bands in the CSI feedback band are divided into a same RB set, and non-consecutive sub-bands belong to different RB sets.

In an embodiment, the number M of RB sets is obtained by the terminal measuring the CSI-RS, and then fed back to the base station. When CSI parameters are divided into a first portion and a second portion, M and parameters in the first portion of the CSI are jointly channel coded and fed back, and the overhead of CSI parameters in the second portion is determined by values of M and CSI parameters in the first portion.

In an embodiment, when the number M of RB sets is greater than 1, a number of selected second base vectors is less than the number of selected second base vectors when the number M of RB sets is equal to 1.

Figure 5:
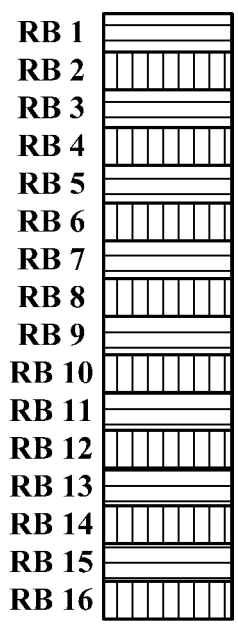
FIG. 5 is a schematic diagram of another RB set division according to the embodiment four of the present disclosure.

In a manner A-2, RBs in the CSI feedback band are divided into M RB sets, where M>1. The terminal respectively feeds back corresponding second coefficient information for each RB set, and feeds back second base vector information for the entire band, that is, each RB set uses a same second base vector. The precoding on each RB set is obtained by a product of the second base vector corresponding to the each RB set and the second coefficient corresponding to the each RB set. The dimension of the second base vector is equal to the number of RBs contained in each RB set. Furthermore, each RB set contains a same number of RBs. In some embodiments, RBs contained in one RB set are distributed in a comb-like manner over the entire band, that is, RBs within a certain number of spacing belong to a same RB set. For example, if each RB set contains G RBs, and the number of RBs contained in the CSI feedback band is R, these R RBs are divided into M RB sets, and RBs with a spacing of M RBs belong to a same RB set. The specific manner for dividing RB sets is shown in FIG. 5, where RBs are divided into two RB sets, RBs having an even index belong to a set one and RBs having an odd index belong to a set two.

More specifically, in this manner, a vector $b_l^m$ formed by first coefficients on an mth RB set is as follows:

$$b_l^m = D_l a_l^m$$

$D_l$ is same for each RB set, and may be calculated according to any one of RB sets.

In an embodiment, only when the number of RBs in the CSI feedback band is greater than or equal to a threshold R0, multiple RB sets are divided, otherwise there is only one RB set.

In an embodiment the number M of RB sets is obtained by the terminal measuring the CSI-RS, and then fed back to the base station. When CSI parameters are divided into a first portion and a second portion, M and parameters in the first portion of the CSI are jointly channel coded and fed back, and the overhead of CSI parameters in the second portion is determined by values of M and parameters in the first portion of the CSI.

In an embodiment, the number of selected second base vectors with the number M of RB sets greater than 1 is less than the number of selected second base vectors with the number M of RB sets equal to 1.

Figure 6:
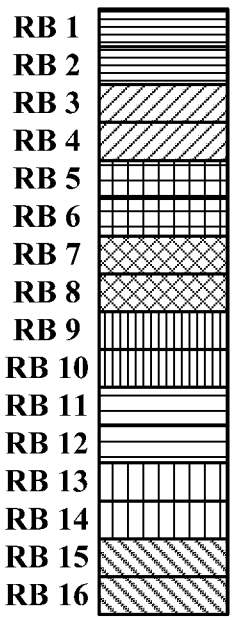
FIG. 6 is a schematic diagram of still another RB set division according to the embodiment four of the present disclosure.

In a manner A-3, FIG. 6 illustrates a method for dividing RB sets. The RBs in the CSI feedback band are divided into M RB sets. G consecutive RBs belong to a same RB set, and G is less than the number of RBs contained in the sub-band. RBs in each RB set use same precoding, i.e., RBs in each RB set use a same first coefficient. In addition, the dimension of the second base vector is equal to the number M of RB sets. Different RB sets use a same set of second base vectors and a same set of second coefficients, i.e., the terminal calculates the second base vectors and second coefficients based on first coefficients on different RB sets.

For a certain layer, the precoding vector on an mth RB set may be represented as follows:

$$f_m = W_1 c_m$$

For a precoding vector of this layer, first coefficients on each RB set are combined into a following matrix C.

$$C = \begin{bmatrix} c_{11} & \cdots & c_{1M} \\ \vdots & \ddots & \vdots \\ c_{L1} & \cdots & c_{LM} \end{bmatrix}$$

The transpose of an P h row vector in the matrix C or an P h column vector of a conjugate transposed matrix of the matrix C is $b_l$, and $b_l$ is written into a linear combination of a group of base vectors, shown as follows:

$$b_l = D_l a_l$$

The terminal feeds back selected second base vectors in $D_l$, quantifies and feeds back amplitude information and phase information of elements in $a_l$.

In an embodiment, the number G of RBs in each RB set is determined by the number of RBs in the CSI feedback band. For example, if the number of RBs in the CSI feedback band is greater than a certain threshold R0, then G>1, otherwise G=1.

In an embodiment, each sub-band contains M0 RB sets, and a CQI of a sub-band is calculated based on the precoding on these M0 RB sets.

It should be noted that there are several factors to take into consideration in the selection of the second base vectors, i.e., the vectors in $D_l$.

In some implementations of this embodiment, the second base vectors are composed of DFT vectors. The more specific manner for selecting the second base vectors includes, but is not limited to, at least one of following manners.

The number of RBs contained in the CSI band is R when the frequency domain division methods in A-1, A-2, or A-3 is not used; the number of RBs contained in each RB set is R when the frequency domain division methods in A-1 or A-2 is used, and the number of RB sets is R when the frequency domain division method in A-3 is used.

In a manner B-1, for a precoding vector of a certain layer, the terminal reports corresponding second base vector information for each reported first base vector.

When the second base vectors are selected according to the above manner, the terminal may feedback different $D_l$ for different l. In an optimized example, at least one of following manners may be further employed.

In a sub-manner B-1-1, the terminal respectively and independently encodes and reports corresponding second base vector information for each reported first base vector. Specifically, the terminal independently feeds back second base vector information contained in the $D_l$ for each l. For example, for each l, the terminal reports an indication $i_l = \{i_l^{(1)}, \ldots, i_l^{(K)}\}$ for a group of second base vectors, where each parameter in il represents one second base vector. For example, $i_1^{(k)}$ indicates a DFT vector $$\begin{bmatrix} 1 & \exp\left(j\theta_{i_l^{(k)}}\right) & \cdots & \exp\left(j(R-1)\theta_{i_l^{(k)}}\right) \end{bmatrix}^T.$$

In a sub-manner B-1-2, the terminal respectively reports corresponding second base vector information through differential encoding for each reported first base vector. Specifically, the terminal feeds back second base vector information contained in Dl respectively for each l. For l>1, the second base vector information fed back corresponding to an lth first base vector is obtained by differential encoding on a second base vector corresponding to a 1st first base vector, or by differential encoding on a second base vector corresponding to an (l−1)th first base vector. For example, for l=1, the terminal reports an indication $i_l = \{i_l^{(1)}, \ldots, i_l^{(K)}\}$ for the group of second base vectors, where each parameter in il represents one second base vector. For example, $i_1^{(k)}$ indicates a DFT vector $$\begin{bmatrix} 1 & \exp\left(j\theta_{i_l^{(k)}}\right) & \cdots & \exp\left(j(R-1)\theta_{i_l^{(k)}}\right) \end{bmatrix}^T.$$

For l>1, the terminal reports the indication $i_l = \{i_l^{(1)}, \ldots, i_l^{(K)}\}$ for the group of second base vectors, where $i_1^{(k)}$ indicates a DFT vector as follows:

$$\begin{bmatrix} 1 & \exp\left(j\left(\theta_{i_1^{(k)}} + \delta_{i_l^{(k)}}\right)\right) & \cdots & \exp\left(j(R-1)\left(\theta_{i_1^{(k)}} + \delta_{i_l^{(k)}}\right)\right) \end{bmatrix}^T$$

In some embodiments, for l=1, the terminal reports the indication $i_l = \{i_l^{(1)}, \ldots, i_l^{(K)}\}$ for the group of second base vectors, where each parameter in $i_1$ represents one second base vector. For example, $i_1^{(k)}$ indicates a DFT vector $$\left[1 \quad \exp\left(j\theta_{i_1^{(k)}}\right) \quad \cdots \quad \exp\left(j(N-1)\theta_{i_1^{(k)}}\right)\right]^T.$$

For l>1, the terminal reports the indication $i_1$ for the group of second base vectors, and a $k^{th}$ second base vector is a DFT vector shown as follows:

$$\left[1 \quad \exp\left(j\left(\theta_{i_1^{(k)}} + \delta_{i_l}\right)\right) \quad \cdots \quad \exp\left(j(R-1)\left(\theta_{i_1^{(k)}} + \delta_{i_l}\right)\right)\right]^T$$

In a manner B-2, for precoding of a certain layer, the terminal reports a group of corresponding second base vector information for all reported first base vectors, that is, all reported first base vectors use a same group of second base vectors. For the precoding of a certain layer, the terminal only reports indication information about the group of second base vectors, i.e., $i = \{i_1, i_2, \ldots, i_K\}$, where $i_k$ represents a DFT vector as follows.

$[1 \; \exp(j\theta_{i_k}) \exp(j(R-1)\theta_{i_k})]^T.$

Each vector in $D_l = D$ is a DFT vector indicated by each element in i. The final matrix C may be written as $C^T = DA$ or $C^H = DA$, where $A = \{a_1, \ldots, a_L\}$.

On the other hand, the manner for determining the optional set of vectors in D or $D_l$ includes, but is not limited to, at least one of following manners.

In a manner C-1, the optional set of vectors is determined according to base station configuration signaling. The more specific manner may include, but is not limited to, at least one of following sub-manners. It is to be noted that if the RB sets are divided by using the above manner A-1, the base station configures one set of signaling in at least one of following manners for each RB sub-set.

In a sub-manner C-1-1, the base station configuration signaling configures a parameter O, and the optional set of second base vectors is $\{v_1, \ldots, v_{RO}\}$, where an $s^{th}$ vector $v_s$ is $$v_s = \left[1 \quad \exp\left(j\frac{s}{RO}2\pi\right) \quad \cdots \quad \exp\left(j\frac{(R-1)s}{RO}2\pi\right)\right]^T.$$

In a sub-manner C-1-2, for a certain parameter O, the base station configures a set of DFT vectors which includes vectors that may be selected as the second base vectors. For example, the base station configures a bit map with a length of RO, where a bit with a value of 1 represents that a vector in $\{v_1, \ldots, v_{RO}\}$ corresponding to a position where this bit is located may be used as a candidate vector of the second base vectors. In another example, the base station configures a starting position $s_{start}$ of optional DFT vectors and the number $s_{length}$ of the optional DFT vectors, then in $\{v_1, \ldots, v_{RO}\}$, $\{v_{s_{start} \bmod RO}, \ldots, v_{(s_{start}+s_{length}) \bmod RO}\}$ is an optional base vector candidate set. In other embodiments, $\{v_1, \ldots, v_{RO}\}$ is divided into multiple orthogonal vector groups, in which mutually orthogonal vectors are divided into one group, and the base station configures an optional vector group and optional vectors in the selected orthogonal vector group according to the signaling.

In a manner C-2, the optional set of vectors is determined according to an agreed rule. For example, in the above manner B-1-1, the value of the parameter O is fixed, for example, O=4 or O=1, or the value of the parameter O is determined according to a value of L.

In a manner C-3, the terminal determines the value of O according to channel measurement. After the terminal determines the value of O according to the channel measurement, the second base vector candidate set is $\{v_1, \ldots, v_{RO}\}$. The terminal reports the value of O, the reported value of O, the RI, and a CQI corresponding to a first codeword are used as joint channel coding of a first portion of the CSI, and the other CSI parameters are as joint channel coding of a second portion of the CSI, where values of parameters of the first portion of the CSI determine the feedback overhead of the second portion.

On the other hand, the manner for selecting second base vectors from the second base vector candidate set includes, but is not limited to, at least one of following manners.

In a manner D-1, K selected second base vectors are mutually orthogonal. Specifically, the optional second base vectors are divided into multiple vector groups, and every two DFT vectors in each group are mutually orthogonal. For example, the optional second base vectors are divided into O groups, $\{v_t, v_{O+t}, v_{2O+t}, \ldots, v_{(R-1)O+t}\}$, where t denotes a group index, and a value of t is $\{1, 2, \ldots, O\}$. The terminal reports a group index t selected by itself, and index information of K second base vectors in the corresponding orthogonal group.

In a manner D-2, selected second base vectors are K consecutive second base vectors in the candidate set. Specifically, the candidate set $\{v_1, \ldots, v_{RO}\}$ is divided into multiple vector groups, and each group contains K consecutive second base vectors. For example, an mth group is $\{v_{(m-1)d+1 \bmod RO}, v_{(m-1)d+2 \bmod RO}, \ldots, v_{(m-1)d+K \bmod RO}\}$, where d is a positive integer less than or equal to K, and d may be determined according to base station signaling or in an agreed manner, for example, d has an integer value obtained from dividing K by 2, and m has a value range including integers from 1 to $$\left\lceil \frac{RO}{d} \right\rceil.$$

The terminal reports the value of m, and the selected K second base vectors are the mth group of base vectors.

In a manner D-3, selected second base vectors are K base vectors selected from X consecutive second base vector in the candidate set. Specifically, the candidate set $\{v_1, \ldots, v_{RO}\}$ is divided into multiple vector groups, and each group contains X consecutive second base vectors. For example, an mth group is $\{v_{(m-1)d+1 \bmod RO}, v_{(m-1)d+2 \bmod RO}, \ldots, v_{(m-1)d+X \bmod RO}\}$ where d is a positive integer less than or equal to X and d may be determined according to base station signaling or in an agreed rule, for example, d has a value of X, or an integer value obtained from dividing K by 2, and m has a value range including integers from 1 to $$\left\lceil \frac{RO}{d} \right\rceil.$$

The terminal reports the value of m and information corresponding to K second base vectors selected from the mth group of base vectors. The value of X may be determined in an agreed manner or by base station configuration signaling such as codebook limitation signaling.

In some embodiments, if the RB sets are divided in the manner A-1, the terminal reports one value of m for all RB sets, that is, all RB sets use a same m, and reports information corresponding to K second base vectors selected from the mth group of base vectors for each RB set respectively.

In addition, since the CSI feedback band may contain non-consecutive sub-bands, in this case, if the full DFT vector generated by the CSI feedback band is still used for the second base vectors, the advantages of the DFT vector cannot be used, and thus the second base vectors may be generated using the following method.

Figure 7:
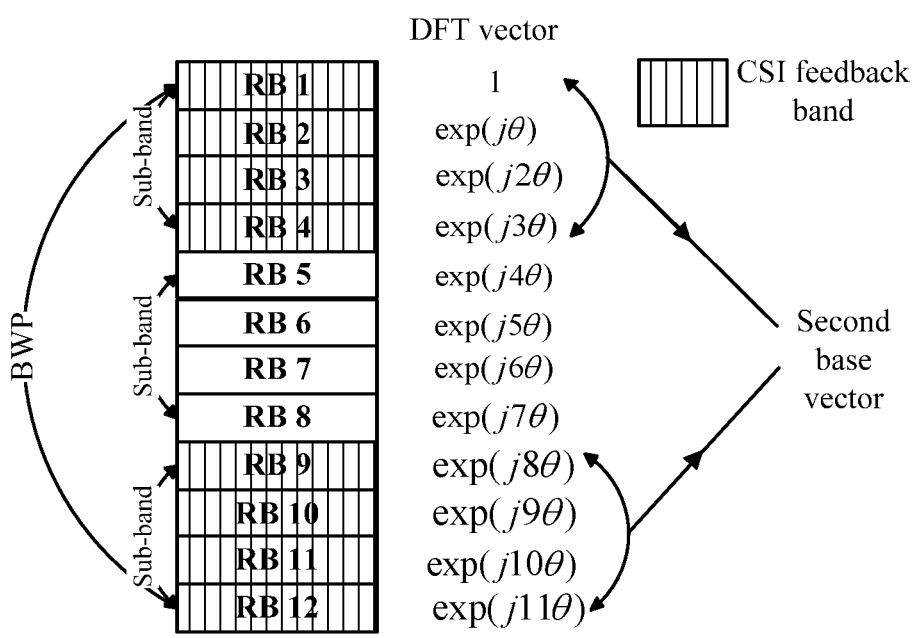
FIG. 7 is a schematic diagram of intercepting second base vectors from a BWP according to the embodiment four of the present disclosure.

In a manner E, a DFT vector with a corresponding length is generated according to the number of sub-bands contained in the downlink BWP corresponding to the CSI, and the second base vectors are intercepted from this DFT vector according to the configuration of the CSI feedback band. Specifically, as shown in FIG. 7, if the downlink BWP contains R0 sub-bands, a DFT vector with a length of R0 is generated, i.e., $v_0 = \{v_0^{(1)}, \ldots, v_0^{(R0)}\}^T$. There is a one-to-one mapping between each element in the DFT vector and the R0 sub-bands. The CSI feedback band contains R sub-bands of the R0 sub-bands, where R≤R0, then the intercepted second base vectors consist of elements corresponding to the sub-bands contained in the CSI feedback band For the quantization feedback of the second coefficient information in the sub-band level CSI feedback method, that is the quantization feedback of $\{a_1, \ldots, a_L\}$, for precoding of a certain layer, each vector $a_l$ is a K-dimensional vector including weighting coefficients for a linear combination of the second base vectors, where the linear combination is to generate the vector consisting of weighting coefficients of an lth first base vector in the linear combination of the first base vectors on R RBs or RB sets. The second coefficients to be fed back form the following matrix:

$$A = [a_1, \ldots, a_L]$$

The feedback of the second coefficient information in the above matrix A requires quantified feedback of amplitude information and phase information of elements in the matrix. The specific manner for quantified feedback includes, but is not limited to, at least one of the following manners.

In a manner F-1, the terminal quantifies the second coefficient amplitude information to be between 0 and 1, and feeds back the quantified second coefficient amplitude information.

In some embodiments, for the matrix A, calculated second coefficients in the precoding of a certain layer are divided by a maximum value of amplitude of the second coefficients, i.e., $$A' = \frac{1}{M_W} A,$$

where $M_W$ is the maximum value of amplitude of the elements in the matrix A. The terminal quantifies the amplitude of each element in the A' to be between 0 and 1 and feeds back quantified amplitudes served as the second coefficient amplitude information to the base station.

In a manner F-2, the terminal feeds back information of two components of the second coefficient amplitude. A first component and a second component of the second coefficient amplitude are quantified to be between 0 and 1. The second coefficient amplitude used in the precoding is a product of these two components. Furthermore, for a certain first base vector, i.e., for a certain l, second components of corresponding K second coefficient amplitudes are the same; or for a certain second base vector, i.e., for each row in the matrix A, second components of corresponding L second coefficient amplitudes are the same.

In some embodiments, for the matrix A, the matrix A' is obtained through dividing each element in the matrix A by the maximum value of amplitude in a row or column where the each element is located. The amplitude of each element in the matrix A' is quantified to be between 0 and 1, and the quantized amplitude of each element served as the first component of the second coefficient amplitude is fed back to the base station. In addition, after the terminal divides the maximum value of amplitude in each row or each column by the maximum value of amplitude of all elements in the matrix A, the terminal quantifies the obtained values to be between 0 and 1, and feeds back the quantified values served as the second component of the second coefficient amplitude to the base station. Finally, a second coefficient amplitude used in the precoding is obtained based on a product of the first component and second component corresponding to the second coefficient amplitude.

For the quantization of the second coefficient phase, the performance of the quantization may also be improved by using a two-step quantization method. The specific quantization feedback method includes, but is not limited to, at least one of the following manners.

In a manner G-1, the terminal feeds back information about two components of the second coefficient phase. The second component represents a variation range of phase of elements in each row or column of the matrix A, for example, the maximum value of phase, one of the second components is fed back for each row or column, i.e., second coefficient phases contained in a certain row or column of the matrix A vary from 0 to this maximum value of phase. The calculated phases of elements in the matrix A are quantified into first components of corresponding second coefficient phases, where a first component has a value range from 0 to this maximum value of phase. Finally, a quantified second coefficient phase is equal to the first component of this second coefficient phase.

In a manner G-2, the terminal feeds back information about two components of the second coefficient phase. The second component represents phase variation feedback of each row or column of the matrix A, for example, the maximum value of phase, one of the second components is fed back for each row or column, i.e., second coefficient phases contained in a certain row or column of the matrix A vary from 0 to this maximum value of phase. Ratios or a difference between phases of elements in the matrix A and the above second components are obtained according to the calculated second coefficient phases in the matrix A, and these ratios and differences are quantified into first components of the second coefficient phase. Finally, a quantified second coefficient phase is a product or sum of the first component and the second component of this second coefficient phase.

Embodiment Five

Figure 8:
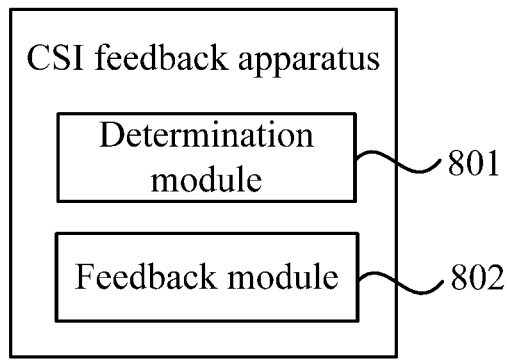
FIG. 8 is a structural diagram of a CSI feedback apparatus applied to a terminal according to an embodiment five of the present disclosure.

FIG. 8 illustrates a CSI feedback apparatus applied on a terminal according to an embodiment of the present disclosure. As shown in FIG. 8, the apparatus includes a determination module 801 and a feedback module 802.

The determination module 801 is configured to determine precoding matrix indication information (PMI), the PMI includes first base vector information, second base vector information and second coefficient information, and the second coefficient information includes second coefficient amplitude information and/or second coefficient phase information; for one transmission layer, precoding vectors corresponding to frequency domain resources in a preset frequency domain unit are the same, the precoding vector is a linear combination of first base vectors, and weighting coefficients used in the linear combination of the first base vectors are first coefficients; on multiple frequency domain units contained in a CSI feedback band, a vector composed of first coefficients corresponding to a same first base vector is a linear combination of second base vectors, and weighting coefficients used in the linear combination of the second base vectors are second coefficients.

The feedback module 802 is configured to feed back CSI containing the PMI to a base station.

In this embodiment, a precoding vector of each layer is represented as a linear combination of a set of codebook base vectors, and the set of codebook base vectors may be referred to as first base vectors. The terminal calculates weighting coefficients used in the linear combination according to the first base vectors, these weighting coefficients are first coefficients. For the precoding vector of this layer, the first coefficient in each frequency domain unit may form a matrix C. The transpose of each row vector in the matrix C or each column vector of a conjugate transpose matrix of the matrix C is written as the linear combination of a group of base vectors. The base vector subjected to the linear combination is a second base vector, and a weighting coefficient used when the second base vector is subjected to the linear combination is a second coefficient.

In an embodiment, the frequency domain unit includes at least one of: a sub-band, a resource block (RB) or a first RB set, and a number of RBs contained in the first RB set is less than a number of RBs contained in a sub-band of the CSI feedback band.

In a practical application, different frequency domain units may be selected to achieve different levels of compression feedback effects. The CSI feedback band may include multiple sub-bands, each sub-band is composed of several RBs, and RBs in each sub-band may be divided into different RB sets.

In some implementations of this embodiment, a second base vector is a DFT vector. It should be understood that in other implementations, the second base vector may also be a variation of the DFT vector, such as a Kronecker product of multiple DFT vectors, a cascade form of DFT vectors, or a phase adjustment form of the cascaded DFT vector.

In some implementations of this embodiment, a dimension of a second base vector is equal to a number of frequency domain units contained in the CSI feedback band.

In some implementations of this embodiment, when the frequency domain unit is the RB, all RBs contained in the CSI feedback band are divided into several second RB sets.

In the practical application, when the RB is used as the frequency domain unit to perform the compress and feedback and a number of RBs contained in the CSI feedback band is relatively large, the dimension of the second base vector may be very large. Therefore, the second base vector is selected in the space of a relatively large dimension, so that the decrease of correlation will result in a decrease of the feedback accuracy. Based on this, in this embodiment, the compress and feedback is performed after all RBs contained in the CSI feedback band are divided into RB sets.

In some implementations of this embodiment, the feedback module 802 is specifically configured to: feedback second base vector information and second coefficient information corresponding to each second RB set to the base station; or feedback, by the terminal, second coefficient information corresponding to each second RB set and second base vector information which is common to all second RB sets to the base station.

In some implementations of this embodiment, the second RB set satisfies at least one of: RBs in the second RB set are several consecutive RBs in the CSI feedback band; RBs in the second RB set are several RBs, which are distributed with the preset number of spacings, in the CSI feedback band; or RBs in the second RB set are several RBs, which are distributed with the preset number of spacings, on a BWP where this second RB set is located.

In addition, when the determination module 801 performs a division of second RB sets, in one implementation, the number of the second RB sets divided from the CSI feedback band is determined based on a total number of RBs contained in the CSI feedback band. In another implementation, a dividing strategy adopted when the CSI feedback band is divided into second RB sets is determined based on sub-band distribution information of sub-bands contained in the CSI feedback band. In still another implementation, the number of the second RB sets divided from the CSI feedback band is determined based on a measured channel state information reference signal (CSI-RS).

It should be noted that in the practical application, the determination module 801 is further configured to determine whether the number of second RB sets divided from the CSI feedback band is greater than a preset threshold; if the number of second RB sets divided from the CSI feedback band is greater than the preset threshold, the determination module 801 is further configured to determine to select K1 second base vectors; and if the number of second RB sets divided from the CSI feedback band is not greater than the preset threshold, the determination module 801 is further configured to determine to select K2 second base vectors; where K1 and K2 are positive integers, and K1 is less than K2.

In some implementations, the second base vector information fed back by the terminal to the base station respectively corresponds to each piece of first base vector information. In other implementations, the second base vector information fed back by the terminal to the base station simultaneously corresponds to all first base vector information.

In some implementations, a second base vector candidate set to which the second base vectors belong is determined based on a parameter O, where the second base vector candidate set is one of $\{v1, \ldots, VNO\}$ or a subset of $\{v1, \ldots, VNO\}$; where O is a positive integer, and N is the number of frequency domain units contained in the CSI feedback band. The parameter O may be determined according to base station configuration signaling; or, the parameter O may be determined according to a measured CSI-RS.

It should be noted that in this embodiment, the manner for selecting second base vectors includes, but is not limited to, at least one of: the second base vectors are mutually orthogonal vectors contained in a target orthogonal vector group selected from several orthogonal vector groups in the second base vector candidate set; the second base vectors are consecutive vectors contained in a selected target consecutive vector group selected from several consecutive vector groups containing several consecutive base vectors in the second base vector candidate set; the second base vectors are K base vectors selected from X consecutive base vectors in the second base vector candidate set, where X and K are positive integers; or the second base vectors are vectors intercepted from a DFT vector with a corresponding length generated based on the number of frequency domain units contained in a downlink BWP according to configuration information of the CSI feedback band.

It should further be noted that in this embodiment, the feedback module 802 is further configured to, after two components of the second coefficient amplitude information in the PMI are quantized to be between 0 and 1, feedback the two quantized components to the base station, where the second coefficient amplitude information is a product of the two components, and the two components include a first amplitude component and a second amplitude component. In addition, the feedback module 802 may further configured to feedback two components of the second coefficient phase information in the PMI to the base station, where the second coefficient phase information is a product of the two components or a sum of the two components, and the two components include a first phase component and a second phase component.

Figure 9:
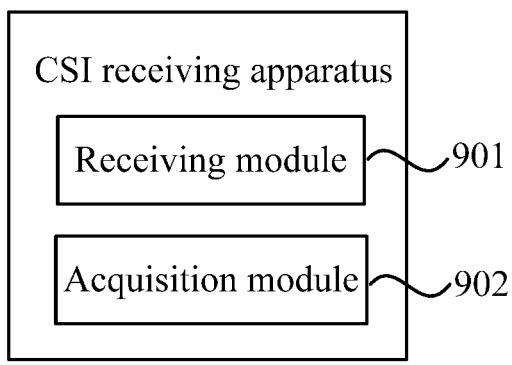
FIG. 9 is a structural diagram of a CSI receiving apparatus applied to a base station according to the embodiment five of the present disclosure.

FIG. 9 illustrates a CSI receiving apparatus applied on a base station according to an embodiment of the present disclosure. As shown in FIG. 9, the apparatus includes a receiving module 901 and an acquisition module 902.

The receiving module 901 is configured to receive CSI containing PMI and fed back by a terminal.

The acquisition module 902 is configured to acquire first base vector information, second base vector information and second coefficient information from the PMI, the second coefficient information includes second coefficient amplitude information and/or second coefficient phase information; precoding vectors corresponding to frequency domain resources in a preset frequency domain unit are the same, the precoding vector is a linear combination of first base vectors, and weighting coefficients used in the linear combination of the first base vectors are first coefficients; on multiple frequency domain units contained in a CSI feedback band, a vector composed of first coefficients corresponding to a same first base vector is a linear combination of second base vectors, and weighting coefficients used in the linear combination of the second base vectors are second coefficients.

The receiving module 901 is further configured to receive the CSI sent by the terminal, and adjust a radio signal that needs to be sent to the terminal according to the CSI, to achieve a better receiving effect on the terminal side. The terminal determines channel information according to a pilot contained in the received downlink signal, selects a precoding matrix that matches with the current channel condition from a codebook, and feeds back PMI corresponding to this precoding matrix to the base station through an uplink channel by means of a feedback link. The base station may determine a precoding matrix used on the terminal according to the received PMI. It should be understood that, in addition to the PMI, the CSI received by the receiving module 901 fed back by the terminal may further include the corresponding RI and CQI, so that the base station determines a number of codewords in the downlink transmission, a layer number in the downlink transmission and a modulation and coding scheme used by each codeword in the downlink transmission.

In addition, a precoding vector of each layer is represented as a linear combination of a set of codebook base vectors, and the set of codebook base vectors may be referred to as first base vectors. The terminal calculates weighting coefficients used in the linear combination according to the first base vectors, these weighting coefficients are first coefficients. For the precoding vector of this layer, the first coefficients in each frequency domain unit may form a matrix C. The transpose of each row vector in the matrix C or each column vector of a conjugate transpose matrix of the matrix C is written as the linear combination of a group of base vectors. The base vector subjected to the linear combination is a second base vector, and a weighting coefficient used when the second base vector is subjected to the linear combination is a second coefficient.

It should be understood that, the frequency domain unit includes at least one of: a sub-band, a resource block (RB) or a first RB set, and a number of RBs contained in the first RB set is less than a number of RBs contained in a sub-band of the CSI feedback band.

In some implementations of this embodiment, when the frequency domain unit is the RB, all RBs contained in the CSI feedback band are divided into several second RB sets.

In the practical application, the second RB set satisfies at least one of characteristics: RBs in the second RB set are several consecutive RBs in the CSI feedback band; RBs in the second RB set are several RBs, which are distributed with the preset number of spacings, in the CSI feedback band; or RBs in the second RB set are several RBs, which are distributed with the preset number of spacings, on a BWP where this second RB set is located.

Through the CSI feedback apparatus provided by this embodiment, in some implementation processes, the determination module is configured to determine precoding matrix indication information (PMI), the PMI includes first base vector information, second base vector information and second coefficient information, and the second coefficient information includes second coefficient amplitude information and/or second coefficient phase information; precoding vectors corresponding to frequency domain resources in a preset frequency domain unit are the same, the precoding vector is a linear combination of first base vectors, and weighting coefficients used in the linear combination of the first base vectors are first coefficients; on frequency domain units contained in a CSI feedback band, a vector composed of first coefficients corresponding to a same first base vector is a linear combination of second base vectors, and weighting coefficients used in the linear combination of the second base vectors are second coefficients; and the feedback module is configured to feedback CSI containing the PMI to a base station. The terminal feeds back CSI after frequency domain and spatial domain channel coefficients are compressed, thereby enduring the high CSI feedback performance while reducing the CSI feedback overhead.

Embodiment Six

Figure 10:
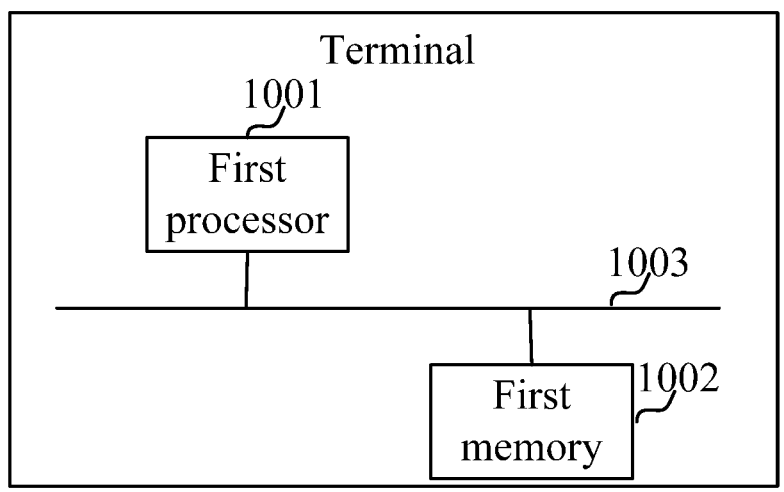
FIG. 10 is a structural diagram of a terminal according to an embodiment six of the present disclosure.

This embodiment further provides a terminal, and as shown in FIG. 10, the terminal includes a first processor 1001, a first memory 1002 and a first communication bus 1003. The first communication bus 1003 is configured to implement a connection communication between the first processor 1001 and the first memory 1002. The first processor 1001 is configured to execute one or more computer programs stored in the first memory 1002 to perform at least one step of the CSI feedback method on the terminal side described above.

Figure 11:
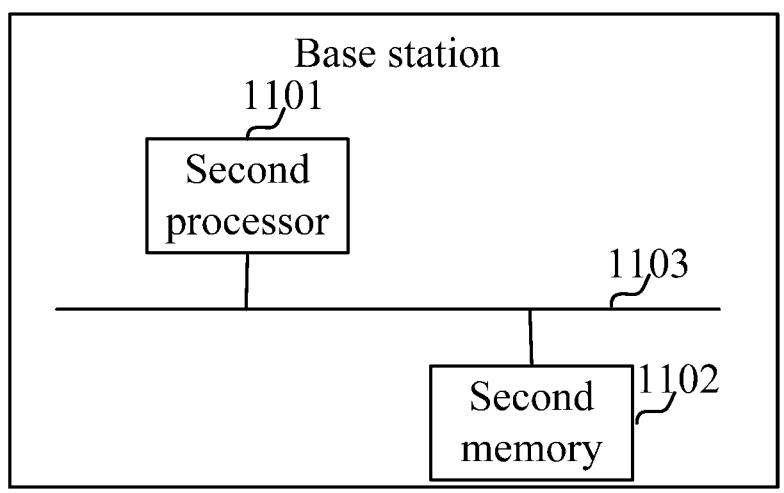
FIG. 11 is a structural diagram of a base station according to the embodiment six of the present disclosure.

This embodiment further provides a base station, as shown in FIG. 11, the base station includes a second processor 1101, a second memory 1102 and a second communication bus 1103. The second communication bus 1103 is configured to implement a connection communication between the second processor 1101 and the second memory 1102. The second processor 1101 is configured to execute one or more computer programs stored in the second memory 1102 to perform at least one step of the CSI receiving method on the base station side described above.

This embodiment further provides a computer readable storage medium. The computer readable storage medium includes volatile or nonvolatile, removable or non-removable media implemented in any method or technology for storing information (such as computer readable instructions, data structures, computer program modules or other data). The computer readable storage medium includes, but is not limited to, a random access memory (RAM), a read-only memory (ROM), an electrically erasable programmable read only memory (EEPROM), a flash memory, or other memory technologies, a compact disc read-only memory (CD-ROM), a digital versatile disc (DVD) or another optical disc storage, a magnetic cassette, a magnetic tape, disk storage or another magnetic storage apparatus, or any other medium used for storing desired information and accessible by a computer.

The computer readable storage medium in this embodiment may be configured to store one or more computer programs executable by a processor to implement at least one step of the methods in the embodiments described above.

This embodiment further provides a computer program which may be distributed on a computer readable medium and executed by a computing apparatus to implement at least one step of the methods in the embodiments described above. In some circumstances, the at least one step illustrated or described may be executed in sequences different from those described in the above embodiments.

This embodiment further provides a computer program product including a computer readable apparatus on which the computer program shown above is stored. The computer readable apparatus in this embodiment may include the computer readable storage medium shown above.

It can be seen that those of ordinary skill in the art should understand that functional modules/units in all or part of the steps of the method, the system and the apparatus disclosed above may be implemented as software (which may be implemented by computer program codes executable by a computing apparatus), firmware, hardware and appropriate combinations thereof. In the hardware implementation, the division of the functional modules/units mentioned above may not correspond to the division of physical components. For example, one physical component may have multiple functions, or one function or step may be performed jointly by several physical components. Some or all physical components may be implemented as software executed by processors such as central processing units, digital signal processors or microcontrollers, hardware, or integrated circuits such as application specific integrated circuits.

In addition, as is known to those of ordinary skill in the art, a communication medium generally includes computer readable instructions, data structures, computer program modules or other data in modulated data signals such as carriers or other transmission mechanisms, and may include any information delivery medium. Therefore, the present application is not limited to any specific combination of hardware and software.

The above content is a further detailed description of the present disclosure in conjunction with the specific embodiments, and the specific implementation of the present application is not limited to the description. For those skilled in the art to which the present disclosure pertains, a number of simple deductions or substitutions may be made without departing from the concept of the present application and should fall within the protection scope of the present application.

What is claimed is:

1. A channel state information (CSI) feedback method, comprising:
   determining, by a terminal, precoding matrix indication information (PMI), wherein:
      the PMI comprises:
         first base vector information associated with first base vectors;
         second base vector information associated with second base vectors; and
         second coefficient information, used to derive first coefficients and second coefficients, the second coefficient information comprising second coefficient amplitude information and second coefficient phase information; and
      a CSI feedback band comprises a plurality of frequency domain units, each frequency domain unit having a plurality of frequency domain resources and the frequency domain units respectively belong to a plurality of frequency domain unit sets; and
   feeding back, by the terminal, CSI containing the PMI to a base station.

2. The method of claim 1, wherein a frequency domain unit of the plurality of frequency domain units comprises at least one of: a sub-band or a first resource block (RB), wherein a number of RBs in the first RB set is less than a number of RBs contained in a sub-band of the CSI feedback band.

3. The method of claim 1, wherein a dimension of each second base vector is equal to a number of frequency domain units contained in the CSI feedback band.

4. The method of claim 1, wherein the feeding back CSI includes:
   feedbacking a first portion of the CSI including a number of the plurality of frequency domain unit sets; and
   feedbacking a second portion of the CSI.

5. The method of claim 1, wherein feeding back the CSI containing the PMI to the base station comprises:
   feeding back, by the terminal, second base vector information corresponding to each of the plurality of frequency domain unit sets and second coefficient information corresponding to each of the plurality of frequency domain unit sets to the base station; or
   feeding back, by the terminal, second coefficient information corresponding to each of the plurality of frequency domain unit sets and second base vector information in common to all of the plurality of frequency domain unit sets to the base station.

6. The method of claim 1, wherein the second base vector information fed back by the terminal to the base station respectively corresponds to each piece of first base vector information.

7. The method of claim 1, wherein a same second base vector information corresponds to the first based vector is reported for a precoding vector of a same layer, the precoding vector being a linear combination of the first base vectors.

8. The method of claim 1, wherein each of the frequency domain unit set satisfies at least one of:
   the frequency domain units in each of the frequency domain unit set are a plurality of consecutive RBs in the CSI feedback band;

frequency domain units in each of the frequency domain unit set are a plurality of RBs, which are distributed with a preset number of spacings, in the CSI feedback band; or frequency domain units in each of the frequency domain unit set are a plurality of RBs, which are distributed with a preset number of spacings, on a bandwidth part (BWP) corresponding to the CSI.

9. The method of claim 1, wherein a number of the frequency domain unit sets is determined based on a total number of the frequency domain units contained in the CSI feedback band.

10. The method of claim 1, further comprising:
determining whether a number of the plurality of frequency domain unit sets is greater than a preset threshold; and
in response to a determination result that the number of the plurality of frequency domain unit sets is greater than the preset threshold, determining to select K1 second base vectors, or alternatively, in response to a determination result that the number of the plurality of frequency domain unit sets is less than or equal to the preset threshold, determining to select K2 second base vectors, wherein K1 and K2 are positive integers, and K1 is less than K2.

11. The method of claim 1, wherein the second base vectors belong to a second base vector candidate set, the second base vector candidate set is determined based on a parameter N, and the second base vector candidate set is $\{v_1, \ldots, v_N\}$ or a subset of $\{v_1, \ldots, v_N\}$; and wherein N is a number of frequency domain units contained in the CSI feedback band.

12. The method of claim 11, wherein when the second base vector candidate set is the subset of $\{v_1, \ldots, v_N\}$, a method of determining the second base vector candidate set comprises:
determining the second base vector candidate set based on a starting position of the second base vector candidate set and a number of vectors in the second base vector candidate set.

13. The method of claim 1, wherein:
the second base vector information comprises:
a vector group index of a selected vector group, or
a vector group index of a selected vector group and a vector index of a vector selected from the selected vector group;
feeding back, by the terminal, the CSI containing the PMI back to the base station comprises:
feeding back, by the terminal, a same vector group index back to the base station for multiple frequency domain unit sets among the plurality of frequency domain unit sets in the CSI feedback band; or
feeding back, by the terminal for all of the plurality of frequency domain unit sets in the CSI feedback band, a same vector group index to the base station, and feeding back, for each of the plurality of frequency domain unit sets, a vector index corresponding to the each of the plurality of frequency domain unit sets.

14. The method of claim 1, wherein the second base vectors comprise K base vectors selected from X consecutive base vectors in a second base vector candidate set, and X and K are positive integers.

15. The method of claim 1, wherein the second coefficient amplitude information comprises:
two components to be quantized to be between 0 and 1 to generate two quantized components, wherein a coefficient amplitude used in a precoding vector is a product of the two quantized components and the two components comprise a first amplitude component and a second amplitude component.

16. The method of claim 1, wherein a dimension of a second base vector on a frequency domain unit set is equal to a number of frequency domain units in the frequency domain unit set.

17. The method of claim 1, wherein the frequency domain units in a same frequency domain unit set are consecutives frequency domain units, frequency domain units distributed with a preset number of spacings, in the CSI feedback band, and/or on a BWP where the frequency domain unit set is located.

18. A channel state information (CSI) receiving method, comprising:
receiving, by a base station, CSI containing precoding matrix indication information (PMI) from a terminal; and
acquiring, by the base station, first base vector information associated with first base vectors, second base vector information associated with second base vectors, and second coefficient information from the PMI, the second coefficient information being used to derive first coefficients and second coefficients, wherein:
the second coefficient information comprising second coefficient amplitude information and second coefficient phase information; and
a CSI feedback band comprises a plurality of frequency domain units, each frequency domain unit having a plurality of frequency domain resources and the frequency domain units respectively belong to a plurality of frequency domain unit sets.

19. A terminal, comprising:
at least one processor;
at least one memory; and
a communication bus, coupled between the at least one processor and the at least one memory, wherein the at least one processor is configured to execute one or more computer programs stored in the at least one memory to perform steps comprising:
determining, by the terminal, precoding matrix indication information (PMI), wherein:
the PMI comprises:
first base vector information associated with first base vectors;
second base vector information associated with second base vectors; and
second coefficient information, used to derive first coefficients and second coefficients, the second coefficient information comprising second coefficient amplitude information and second coefficient phase information; and
a CSI feedback band comprises a plurality of frequency domain units, each frequency domain unit having a plurality of frequency domain resources and the frequency domain units respectively belong to a plurality of frequency domain unit sets; and
feeding back, by the terminal, CSI containing the PMI to a base station.

20. A base station, comprising:
at least one processor;
at least one memory; and
a communication bus, coupled between the at least one processor and the at least one memory, wherein the at least one processor is configured to execute one or more computer programs stored in the at least one memory to perform steps comprising:

receiving, by the base station, CSI containing precoding matrix indication information (PMI) from a terminal; and acquiring, by the base station, first base vector information associated with first base vectors, second base vector information associated with second base vectors, and second coefficient information from the PMI, the second coefficient information being used to derive first coefficients and second coefficients, wherein:

the second coefficient information comprising second coefficient amplitude information and second coefficient phase information; and a CSI feedback band comprises a plurality of frequency domain units, each frequency domain unit having a plurality of frequency domain resources and the frequency domain units respectively belong to a plurality of frequency domain unit sets.

* * * * *